(12) United States Patent
Bian et al.

(10) Patent No.: US 11,947,998 B2
(45) Date of Patent: Apr. 2, 2024

(54) DISPLAY METHOD AND DEVICE

(71) Applicant: Huawei Technologies Co., Ltd., Shenzhen (CN)

(72) Inventors: Sucheng Bian, Nanjing (CN); Kai Hu, Nanjing (CN); Xueer Zhou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/043,627

(22) PCT Filed: Aug. 27, 2021

(86) PCT No.: PCT/CN2021/114990
§ 371 (c)(1),
(2) Date: Mar. 1, 2023

(87) PCT Pub. No.: WO2022/048500
PCT Pub. Date: Mar. 10, 2022

(65) Prior Publication Data
US 2023/0273812 A1 Aug. 31, 2023

(30) Foreign Application Priority Data
Sep. 2, 2020 (CN) .......................... 202010911452.0

(51) Int. Cl.
*G06F 9/48* (2006.01)
*G06F 3/04812* (2022.01)
*G06F 3/04886* (2022.01)

(52) U.S. Cl.
CPC ........ *G06F 9/4862* (2013.01); *G06F 3/04812* (2013.01); *G06F 3/04886* (2013.01)

(58) Field of Classification Search
CPC .. G06F 9/4862; G06F 3/04812; G06F 3/0486; G06F 3/04892; G06F 3/023;
(Continued)

(56) References Cited

U.S. PATENT DOCUMENTS 10,234,953 B1 * 3/2019 Li ............................. G06F 9/54
11,029,838 B2 * 6/2021 LeMay ................. G06F 3/0488
(Continued)

FOREIGN PATENT DOCUMENTS

CN 103279288 A 9/2013
CN 103425408 A 12/2013
(Continued)

OTHER PUBLICATIONS

Wang Changhong, "Try the remote projection function," Computer Knowledge and Technology (Experience Skills), Issue 11, 2018, with an English translation, 6 pages.
(Continued)

*Primary Examiner* — Sargon N Nano
(74) *Attorney, Agent, or Firm* — Conley Rose, P.C.

(57) ABSTRACT

A method includes a second terminal that displays a first interface, and receives a first operation of a user on content on the first interface. The second terminal sends data to a first terminal in response to the first operation when an input source of the first operation is an input device of the first terminal, where the data is used by the first terminal to display a second interface on a display of the first terminal. The second terminal displays the second interface on a display of the second terminal in response to the first operation when the input source of the first operation is an input device of the second terminal.

18 Claims, 22 Drawing Sheets

(58) Field of Classification Search
CPC .............. G06F 3/03543; G06F 3/0487; G06F 3/04842; G06F 3/04845
See application file for complete search history.

(56) References Cited

U.S. PATENT DOCUMENTS

| | | | |
|---|---|---|---|
| 11,036,310 B2* | 6/2021 | Seo ..................... | G06F 3/0486 |
| 11,196,933 B2* | 12/2021 | Misawa ................ | H04N 23/61 |
| 11,599,322 B1 | 3/2023 | Johnson et al. | |
| 2001/0012025 A1 | 8/2001 | Wojaczynski et al. | |
| 2012/0046071 A1 | 2/2012 | Brandis et al. | |
| 2013/0080143 A1* | 3/2013 | Reeves ................. | G06F 9/451 713/1 |
| 2013/0318451 A1* | 11/2013 | Wu ....................... | G06F 3/038 715/754 |
| 2014/0082519 A1 | 3/2014 | Wang et al. | |
| 2014/0136986 A1* | 5/2014 | Martin ................. | G06F 3/0485 715/748 |
| 2015/0195607 A1 | 7/2015 | Kim et al. | |
| 2015/0356949 A1* | 12/2015 | Kim ...................... | H04W 4/18 345/173 |
| 2016/0050476 A1 | 2/2016 | Patil | |
| 2017/0017454 A1* | 1/2017 | Kim .................... | G06F 3/04845 |
| 2017/0228207 A1 | 8/2017 | Szeto et al. | |
| 2018/0077547 A1* | 3/2018 | Sanchez Barajas .. | H04W 4/023 |
| 2019/0265941 A1* | 8/2019 | Baba ..................... | G06F 16/955 |
| 2020/0053417 A1 | 2/2020 | Choi et al. | |
| 2021/0027742 A1 | 1/2021 | Li | |
| 2021/0064191 A1* | 3/2021 | Liao .................... | G06F 3/04845 |
| 2021/0240332 A1 | 8/2021 | Walkin et al. | |
| 2022/0224968 A1 | 1/2022 | Wang et al. | |
| 2022/0279062 A1 | 9/2022 | Ye | |

FOREIGN PATENT DOCUMENTS

| | | |
|---|---|---|
| CN | 104137048 A | 11/2014 |
| CN | 104349110 A | 2/2015 |
| CN | 104811793 A | 7/2015 |
| CN | 105183343 A | 12/2015 |
| CN | 105892851 A | 8/2016 |
| CN | 105955689 A | 9/2016 |
| CN | 106354451 A | 1/2017 |
| CN | 106406127 A | 2/2017 |
| CN | 106844063 A | 6/2017 |
| CN | 107124690 A | 9/2017 |
| CN | 107222936 A | 9/2017 |
| CN | 107425942 A | 12/2017 |
| CN | 107491469 A | 12/2017 |
| CN | 107846617 A | 3/2018 |
| CN | 108123826 A | 6/2018 |
| CN | 108647062 A | 10/2018 |
| CN | 108718439 A | 10/2018 |
| CN | 104618793 B | 11/2018 |
| CN | 108829323 A | 11/2018 |
| CN | 108874713 A | 11/2018 |
| CN | 108958684 A | 12/2018 |
| CN | 109120970 A | 1/2019 |
| CN | 109669747 A | 4/2019 |
| CN | 109690967 A | 4/2019 |
| CN | 109889885 A | 6/2019 |
| CN | 10109636 A | 8/2019 |
| CN | 10267073 A | 9/2019 |
| CN | 110321093 A | 10/2019 |
| CN | 110515579 A | 11/2019 |
| CN | 110557674 A | 12/2019 |
| CN | 110597473 A | 12/2019 |
| CN | 110602805 A | 12/2019 |
| CN | 110618970 A | 12/2019 |
| CN | 110908625 A | 3/2020 |
| CN | 111314768 A | 6/2020 |
| CN | 111324327 A | 6/2020 |
| CN | 111399789 A | 7/2020 |
| CN | 111443884 A | 7/2020 |
| CN | 111666055 A | 9/2020 |
| CN | 111782427 A | 10/2020 |
| CN | 112148182 A | 12/2020 |
| EP | 2632188 A1 | 8/2013 |
| EP | 4080345 A1 | 10/2022 |
| EP | 4095671 A1 | 11/2022 |
| KR | 20180042643 A | 4/2018 |
| WO | 0203186 A2 | 1/2002 |

OTHER PUBLICATIONS

Marquardt Nicolai et al: "Gradual engagement facilitating information exchange between digital devices as a function of proximity", Proceedings of the Third ACM Conference on Data and Application Security and Privacy, CODASPY"13, ACM Press, New York, New York, USA, Nov. 11, 2012, XP058985017, 10 pages.

* cited by examiner

DISPLAY METHOD AND DEVICE

CROSS-REFERENCE TO RELATED APPLICATIONS

This is a U.S. National Stage of International Patent Application No. PCT/CN2021/114990 filed on Aug. 27, 2021, which claims priority to Chinese Patent Application No. 202010911452.0 filed on Sep. 2, 2020. Both of the aforementioned applications are hereby incorporated by reference in their entireties.

TECHNICAL FIELD

This application relates to the field of electronic devices, and in particular, to a display method and a device.

BACKGROUND

Currently, a user may have more terminals such as a mobile phone, a tablet computer, and a personal computer (personal computer, PC). In daily work, the user may use a plurality of terminals at the same time, and attention needs to be frequently switched between the plurality of terminals. For example, when the user is using the PC, if the mobile phone receives an SMS message, the user needs to pick up the mobile phone to reply. For another example, when using the PC to write an email, if the user needs a picture on the mobile phone, the user needs to pick up the mobile phone to transfer the picture from the mobile phone to the PC. This seriously affects convenience of collaborative use of the plurality of terminals.

To improve convenience of collaborative use of the plurality of terminals, the user may connect the plurality of terminals for use. For example, the user has a PC and a mobile phone. The user may connect the PC and the mobile phone in a wireless or wired manner for collaborative office. Specifically, in a scenario of collaborative office between the PC and the mobile phone, multi screen collaboration implements projection of a display interface of the mobile phone onto a display of the PC for display through mirror projection. In this way, the user can perform an operation on the mobile phone at the PC end. For example, the user may use a mouse of the PC to perform a mouse operation such as a mouse click or mouse movement on an interface projected onto the PC, to perform an operation on an actual interface displayed on the mobile phone. The user may alternatively directly operate the mobile phone by using a touchscreen of the mobile phone.

In the foregoing multi screen collaboration solution, the display interface of the mobile phone is always projected onto the display of the PC for display.

SUMMARY

Embodiments of this application provide a display method and a device. When a plurality of terminals are used collaboratively, an interface may be displayed on a corresponding device based on different input devices used for an input operation of a user. This not only protects user privacy, but also avoids the user from diverting attention, to improve user experience.

To achieve the foregoing objective, the following technical solutions are used in embodiments of this application.

According to a first aspect of this application, a display method is provided. The method may be performed by a second terminal, the second terminal is connected to a first terminal, and the method may include. The second terminal displays a first interface. The second terminal receives a first operation of a user on content on the first interface. The second terminal sends data to the first terminal in response to the first operation when an input source of the first operation is an input device of the first terminal, where the data is used by the first terminal to display a second interface on a display of the first terminal. The second terminal displays the second interface on a display of the second terminal in response to the first operation when the input source of the first operation is an input device of the second terminal.

According to the foregoing technical solution, in a scenario in which the first terminal and the second terminal are collaboratively used, when the user controls the second terminal by using the input device of the first terminal, the second terminal can project a corresponding interface onto the first terminal for display. When the user controls the second terminal by using the input device of the second terminal, the second terminal displays a corresponding interface, and does not project the corresponding interface onto the first terminal for display. In this way, the user can freely control, according to an actual requirement of the user, displaying of the interface of the second terminal on different devices. This not only protects user privacy, but also avoids the user from diverting attention, to improve user experience.

In a possible implementation, when the input source of the first operation is the input device of the first terminal, before the second terminal receives the first operation, the method may further include: The second terminal receives shuttle state information from the first terminal, where the shuttle state information may be used to indicate that a shuttle of an input device starts, or the shuttle state information may be used to indicate that the second terminal starts to accept an input from the input device of the first terminal.

In another possible implementation, when the input source of the first operation is the input device of the first terminal, that the second terminal receives a first operation of a user on content of the first interface may include: The second terminal receives a first operation parameter from the first terminal, where the first operation parameter is an operation parameter included in a first input event corresponding to the first operation when the user performs the first operation by using the input device of the first terminal; and the second terminal simulates the first input event based on the first operation parameter. That the second terminal sends data to the first terminal in response to the first operation may include: The second terminal determines, based on the simulated first input event, that the input source of the first operation is the input device of the first terminal; and the second terminal sends the data to the first terminal in response to the first input event. An input source of a corresponding operation may be determined based on an input event, to determine whether to display a corresponding interface on the second terminal or to project the interface onto another device for display.

In another possible implementation, that the second terminal determines, based on the simulated first input event, that the input source of the first operation is the input device of the first terminal may include: The second terminal determines that an input device identifier included in the simulated first input event is an identifier of a virtual input device, where the virtual input device is created by the second terminal to simulate an input event; or the second terminal determines that an input device type indicated by an input mode included in the simulated first input event is the same as a type of the input device of the first terminal, and determines that the shuttle state information used to indicate that a shuttle of an input device starts is received from the first terminal.

In another possible implementation, that the second terminal displays the second interface on a display of the second terminal in response to the first operation may include: When the user performs the first operation by using the input device of the second terminal, the second terminal determines, based on a second input event corresponding to the first operation, that the input source of the first operation is the input device of the second terminal; and the second terminal displays the second interface on the display of the second terminal in response to the second input event.

In another possible implementation, that the second terminal determines, based on a second input event corresponding to the first operation, that the input source of the first operation is the input device of the second terminal may include: The second terminal determines that an input device identifier included in the second input event is an identifier of the input device of the second terminal; or the second terminal determines that an input device type indicated by an input mode included in the second input event is the same as a type of the input device of the second terminal.

In another possible implementation, the method may further include: The second terminal creates a virtual input device after successfully establishing a connection to the first terminal; or the second terminal receives a notification message from the first terminal, where the notification message is used to indicate that a keyboard and mouse sharing mode of the first terminal is enabled, and the second terminal creates the virtual input device in response to the notification message, where the virtual input device is used by the second terminal to simulate an input of the input device of the first terminal. A virtual input device is created, to implement keyboard and mouse sharing of a plurality of devices, so that an input device of one terminal can control a plurality of terminals by using a keyboard and mouse sharing technology.

In another possible implementation, the method may further include: The second terminal displays a third interface, where the third interface includes an input box. The second terminal receives a second operation of the user on the input box. The second terminal displays a virtual keyboard on the display of the second terminal in response to the second operation when an input source of the second operation is the input device of the second terminal. When the user performs an operation on the input box on the interface by using the input device of the second terminal, the virtual keyboard may be displayed on the second terminal, so that the user can implement input by using the virtual keyboard without diverting attention, to improve efficiency of collaborative use of a plurality of terminals.

In another possible implementation, the method may further include: The second terminal sends data of the third interface to the first terminal in response to the second operation when the input source of the second operation is the input device of the first terminal. No virtual keyboard is displayed on the third interface, and the data of the third interface is used by the first terminal to display the third interface on the display of the first terminal. When the user performs an operation on the input box in the interface by using the input device of the first terminal, the virtual keyboard may not be displayed, and the third interface is projected onto the first terminal for display. The user may implement input by using the keyboard of the first terminal without diverting attention, to improve efficiency of collaborative use of a plurality of terminals.

In another possible implementation, that the second terminal displays a virtual keyboard on the display of the second terminal in response to the second operation may include: When the user performs the second operation by using the input device of the second terminal, the second terminal determines, based on a third input event corresponding to the second operation, that the input source of the second operation is the input device of the second terminal; and the second terminal displays a virtual keyboard on the display of the second terminal in response to the third input event.

In another possible implementation, that the second terminal determines, based on a third input event corresponding to the second operation, that the input source of the second operation is the input device of the second terminal may include: The second terminal determines that an input device identifier included in the third input event is an identifier of the input device of the second terminal; or the second terminal determines that an input device type indicated by an input mode included in the third input event is the same as a type of the input device of the second terminal.

In another possible implementation, when the input source of the second operation is the input device of the first terminal, that the second terminal receives a second operation of the user on the input box may include: The second terminal receives a second operation parameter from the first terminal, where the second operation parameter is an operation parameter included in a fourth input event corresponding to the second operation when the user performs the second operation by using the input device of the first terminal; and the second terminal simulates the fourth input event based on the second operation parameter. That the second terminal sends data of the third interface to the first terminal in response to the second operation, and does not display a virtual keyboard on the third interface may include: The second terminal determines, based on the simulated fourth input event, that the input source of the second operation is the input device of the first terminal; and the second terminal sends the data of the third interface to the first terminal in response to the fourth input event, and does not display the virtual keyboard on the third interface.

In another possible implementation, that the second terminal determines, based on the simulated fourth input event, that the input source of the second operation is the input device of the first terminal may include: The second terminal determines that an input device identifier included in the simulated fourth input event is an identifier of a virtual input device; or the second terminal determines that an input device type indicated by an input mode included in the simulated fourth input event is the same as a type of the input device of the first terminal, and determines that the shuttle state information used to indicate that a shuttle of an input device starts is received from the first terminal.

According to a second aspect of this application, a display apparatus is provided. The apparatus may be used in a second terminal, the second terminal is connected to a first terminal, and the apparatus may include: a display unit, configured to display a first interface; an input unit, configured to receive a first operation of a user on content on the first interface; and a sending unit, configured to send data to the first terminal in response to the first operation when an input source of the first operation is an input device of the first terminal, where the data is used by the first terminal to display a second interface on a display of the first terminal. The display unit is further configured to display the second interface on a display of the second terminal in response to the first operation when the input source of the first operation is an input device of the second terminal.

In a possible implementation, when the input source of the first operation is the input device of the first terminal, the apparatus may further include: a receiving unit, configured to receive shuttle state information from the first terminal, where the shuttle state information may be used to indicate that a shuttle of the input device starts.

In another possible implementation, the receiving unit is further configured to receive a first operation parameter from the first terminal, where the first operation parameter is an operation parameter included in a first input event corresponding to the first operation when the user performs the first operation by using the input device of the first terminal. The apparatus may further include a simulation unit and a determining unit. The simulation unit is configured to simulate the first input event based on the first operation parameter. The determining unit is configured to determine, based on the simulated first input event, that the input source of the first operation is the input device of the first terminal. That the sending unit sends data to the first terminal in response to the first operation specifically includes: The sending unit sends the data to the first terminal in response to the first input event.

In another possible implementation, the determining unit is specifically configured to determine that an input device identifier included in the simulated first input event is an identifier of a virtual input device, where the virtual input device is created by the second terminal to simulate an input event; or determine that an input device type indicated by an input mode included in the simulated first input event is the same as a type of the input device of the first terminal, and determine that the shuttle state information used to indicate that a shuttle of an input device starts is received from the first terminal.

In another possible implementation, when the user performs the first operation by using the input device of the second terminal, the determining unit is further configured to determine, based on a second input event corresponding to the first operation, that the input source of the first operation is the input device of the second terminal. That the display unit displays the second interface on a display of the second terminal in response to the first operation may include: The display unit displays the second interface on the display of the second terminal in response to the second input event.

In another possible implementation, the determining unit is specifically configured to: determine that an input device identifier included in the second input event is an identifier of the input device of the second terminal; or determine that an input device type indicated by an input mode included in the second input event is the same as a type of the input device of the second terminal.

In another possible implementation, the apparatus may further include: a creation unit, configured to create a virtual input device after a connection to the first terminal is successfully established; or the receiving unit is further configured to receive a notification message from the first terminal, where the notification message is used to indicate that a keyboard and mouse sharing mode of the first terminal is enabled, and the creation unit is configured to create the virtual input device in response to the notification message, where the virtual input device is used by the second terminal to simulate an input of the input device of the first terminal.

In another possible implementation, the display unit is further configured to display a third interface, where the third interface includes an input box. The input unit is further configured to receive a second operation of the user on the input box. The display unit is further configured to display a virtual keyboard on the display of the second terminal in response to the second operation when an input source of the second operation is the input device of the second terminal.

In another possible implementation, the sending unit is further configured to send data of the third interface to the first terminal in response to the second operation when the input source of the second operation is the input device of the first terminal. No virtual keyboard is displayed on the third interface, and the data of the third interface is used by the first terminal to display the third interface on the display of the first terminal.

In another possible implementation, when the user performs the second operation by using the input device of the second terminal, the determining unit is further configured to determine, based on a third input event corresponding to the second operation, that the input source of the second operation is the input device of the second terminal. That the display unit displays a virtual keyboard on the display of the second terminal in response to the second operation may include: The display unit displays the virtual keyboard on the display of the second terminal in response to the third input event.

In another possible implementation, the determining unit is specifically configured to: determine that an input device identifier included in the third input event is an identifier of the input device of the second terminal; or determine that an input device type indicated by an input mode included in the third input event is the same as a type of the input device of the second terminal.

In another possible implementation, the receiving unit is further configured to receive a second operation parameter from the first terminal, where the second operation parameter is an operation parameter included in a fourth input event corresponding to the second operation when the user performs the second operation by using the input device of the first terminal. The simulation unit is further configured to simulate the fourth input event based on the second operation parameter. The determining unit is further configured to determine, based on the simulated fourth input event, that the input source of the second operation is the input device of the first terminal. That the sending unit sends data of the third interface to the first terminal in response to the second operation specifically includes: The sending unit sends the data of the third interface to the first terminal in response to the fourth input event.

In another possible implementation, the determining unit is specifically configured to determine that an input device identifier included in the simulated fourth input event is an identifier of a virtual input device; or determine that an input device type indicated by an input mode included in the simulated fourth input event is the same as a type of the input device of the first terminal, and determine that the shuttle state information used to indicate that a shuttle of an input device starts is received from the first terminal.

According to a third aspect of this application, a display method is provided. The method may be performed by a second terminal. The second terminal is connected to a first terminal, a keyboard and mouse sharing mode of the first terminal is enabled, and the second terminal creates a virtual input device, configured to simulate an input of an input device of the first terminal. The method may include: The second terminal displays an interface. The second terminal receives an operation of a user on an input box on the interface. When an input source of the operation is an input device of the second terminal, the second terminal displays a virtual keyboard on a display of the second terminal in response to the operation.

According to the foregoing technical solution, in a scenario in which the first terminal and the second terminal are collaboratively used, when the user performs an operation on the input box by using the input device of the second terminal, the virtual keyboard is displayed on the second terminal, and the user may implement input by using the virtual keyboard. In this way, the user does not need to frequently switch attention between the two devices, thereby improving efficiency of collaboratively using the plurality of terminals.

In a possible implementation, the method may further include: When an input source of the operation is an input device of the first terminal, the second terminal does not display the virtual keyboard on the display of the second terminal in response to the operation. In a scenario in which the first terminal and the second terminal are collaboratively used, when the user performs an operation on the input box in the second terminal by using the input device of the first terminal, the second terminal may not display the virtual keyboard of the first terminal, and the user may implement input by using a keyboard of the first terminal. The user does not need to frequently switch attention between two devices, to improve efficiency of collaboratively using the plurality of terminals.

In another possible implementation, the method may further include: When the input source of the operation is the input device of the first terminal, the second terminal sends data of the interface to the first terminal in response to the operation. The data is used by the first terminal to display the interface on a display of the first terminal, and no virtual keyboard is displayed on the interface.

In another possible implementation, that the second terminal displays a virtual keyboard on a display of the second terminal in response to the operation may include: When the user performs the operation on the input box by using the input device of the second terminal, the second terminal determines, based on an input event corresponding to the operation, that the input source of the operation is the input device of the second terminal; and the second terminal displays a virtual keyboard on the display of the second terminal in response to the input event corresponding to the operation.

In another possible implementation, that the second terminal determines, based on an input event corresponding to the operation, that the input source of the operation is the input device of the second terminal includes: The second terminal determines that an input device identifier included in the input event is an identifier of the input device of the second terminal; or the second terminal determines that an input device type indicated by an input mode included in the input event is the same as a type of the input device of the second terminal.

In another possible implementation, when the input source of the operation is the input device of the first terminal, before the second terminal receives the operation on the input box, the method may further include: The second terminal receives shuttle state information from the first terminal, where the shuttle state information may be used to indicate that a shuttle of an input device starts, or the shuttle state information may be used to indicate that the second terminal starts to accept an input from the input device of the first terminal.

In another possible implementation, when the input source of the operation is the input device of the first terminal, that the second terminal receives an operation of a user on an input box may include: The second terminal receives an operation parameter from the first terminal, where the operation parameter is an operation parameter included in the input event corresponding to the operation when the user performs the operation by using the input device of the first terminal; and the second terminal simulates the corresponding input event based on the operation parameter. The method may further include: The second terminal determines, based on the simulated input event, that the input source of the operation is the input device of the first terminal. That the second terminal does not display the virtual keyboard on the display of the second terminal in response to the operation may include: The second terminal does not display the virtual keyboard on the display of the second terminal in response to the input event. That the second terminal sends data of the interface to the first terminal in response to the operation may include: The second terminal sends the data of the interface to the first terminal in response to the input event.

In another possible implementation, that the second terminal determines, based on the simulated input event, that the input source of the operation is the input device of the first terminal may include: The second terminal determines that an input device identifier included in the simulated input event is an identifier of a virtual input device, where the virtual input device is created by the second terminal to simulate an input event; or the second terminal determines that an input device type indicated by an input mode included in the simulated input event is the same as a type of the input device of the first terminal, and determines that the shuttle state information used to indicate that a shuttle of an input device starts is received from the first terminal.

In another possible implementation, the method may further include: The second terminal creates a virtual input device after successfully establishing a connection to the first terminal, or the second terminal receives a notification message from the first terminal, where the notification message is used to indicate that the keyboard and mouse sharing mode of the first terminal is enabled, and the second terminal creates the virtual input device in response to the notification message, where the virtual input device is used by the second terminal to simulate an input of the input device of the first terminal. A virtual input device is created, to implement keyboard and mouse sharing of a plurality of devices, so that an input device of one terminal can control a plurality of terminals by using a keyboard and mouse sharing technology.

According to a fourth aspect of this application, a display apparatus is provided. The apparatus may be used in a second terminal. The second terminal is connected to a first terminal, a keyboard and mouse sharing mode of the first terminal is enabled, and the second terminal creates a virtual input device, configured to simulate an input of an input device of the first terminal. The apparatus may include: a display unit, configured to display an interface; an input unit, configured to receive an operation of a user on an input box on the interface. The display unit is further configured to: when an input source of the operation is an input device of the second terminal, display, by the second terminal, a virtual keyboard on a display of the second terminal in response to the operation.

In a possible implementation, the display unit is further configured to: when an input source of the operation is an input device of the first terminal, skip displaying the virtual keyboard on the display of the second terminal in response to the operation.

In another possible implementation, the apparatus may further include: a sending unit, configured to: when the input source of the operation is the input device of the first terminal, send data of the interface to the first terminal in response to the operation. The data is used by the first terminal to display the interface on a display of the first terminal, and no virtual keyboard is displayed on the interface.

In another possible implementation, when the user performs the operation on the input box by using the input device of the second terminal, the apparatus may further include: a determining unit, configured to determine, based on an input event corresponding to the operation, that the input source of the operation is the input device of the second terminal. That the display unit displays a virtual keyboard on the display of the second terminal in response to the operation may include: The display unit displays the virtual keyboard on the display of the second terminal in response to the input event corresponding to the operation.

In another possible implementation, the determining unit is specifically configured to: determine that an input device identifier included in the input event is an identifier of the input device of the second terminal; or determine that an input device type indicated by an input mode included in the input event is the same as a type of the input device of the second terminal.

In another possible implementation, when the input source of the operation is the input device of the first terminal, the apparatus may further include: a receiving unit, configured to receive shuttle state information from the first terminal, where the shuttle state information may be used to indicate that a shuttle of an input device starts, or the shuttle state information may be used to indicate that the second terminal starts to accept an input from the input device of the first terminal.

In another possible implementation, when the input source of the operation is the input device of the first terminal, the receiving unit is further configured to receive an operation parameter from the first terminal, where the operation parameter is an operation parameter included in the input event corresponding to the operation when the user performs the operation by using the input device of the first terminal. The apparatus may further include: a simulation unit, configured to simulate the corresponding input event based on the operation parameter. The determining unit is further configured to determine, based on the simulated input event, that the input source of the operation is the input device of the first terminal. That the display unit does not display a virtual keyboard on the display of the second terminal in response to the operation may include: The display unit does not display the virtual keyboard on the display of the second terminal in response to the input event. That the sending unit sends data of the interface to the first terminal in response to the operation may include: The sending unit sends the data of the interface to the first terminal in response to the input event.

In another possible implementation, the determining unit is specifically configured to determine that an input device identifier included in the simulated input event is an identifier of a virtual input device, where the virtual input device is created by the second terminal to simulate an input event; or determine that an input device type indicated by an input mode included in the simulated input event is the same as a type of the input device of the first terminal, and determine that the shuttle state information used to indicate that a shuttle of an input device starts is received from the first terminal.

In another possible implementation, the apparatus may further include: a creation unit, configured to create a virtual input device after a connection to the first terminal is successfully established; or the receiving unit is further configured to receive a notification message from the first terminal, where the notification message is used to indicate that a keyboard and mouse sharing mode of the first terminal is enabled, and the creation unit is configured to create the virtual input device in response to the notification message, where the virtual input device is used by the second terminal to simulate an input of the input device of the first terminal. A virtual input device is created, to implement keyboard and mouse sharing of a plurality of devices, so that an input device of one terminal can control a plurality of terminals by using a keyboard and mouse sharing technology.

According to a fifth aspect of this application, a display apparatus is provided. The display apparatus may include a processor, and a memory configured to store instructions that can be executed by the processor. When the processor is configured to execute the instructions, the display apparatus is enabled to perform the method according to any one of the first aspect or the possible implementations of the first aspect, or the method according to any one of the third aspect or the possible implementations of the third aspect.

According to a sixth aspect of this application, a computer readable storage medium is provided. The computer readable storage medium stores computer program instructions. When the computer program instructions are executed by an electronic device, the electronic device is enabled to perform the method according to any one of the first aspect or the possible implementations of the first aspect, or the method according to any one of the third aspect or the possible implementations of the third aspect.

According to a seventh aspect of this application, an electronic device is provided. The electronic device includes a display, one or more processors, and a memory. The display, the processor, and the memory are coupled. The memory is configured to store computer program code, and the computer program code includes computer instructions. When the computer instructions are executed by the electronic device, the electronic device is enabled to perform the method according to any one of the first aspect or the possible implementations of the first aspect, or the method according to any one of the third aspect or the possible implementations of the third aspect.

According to an eighth aspect of this application, a computer program product is provided, including computer readable code or a non volatile computer readable storage medium carrying computer readable code. When the computer readable code is run on an electronic device, a processor in the electronic device performs the method according to any one of the first aspect or the possible implementations of the first aspect, or the method according to any one of the third aspect or the possible implementations of the third aspect.

According to a ninth aspect of this application, a display system is provided, including a first terminal and a second terminal. The first terminal is connected to the second terminal. The second terminal is configured to: display a first interface, and receive a first operation of a user on content on the first interface. The second terminal is further configured to: display a second interface on a display of the second terminal in response to the first operation when an input source of the first operation is an input device of the second terminal; and send data to the first terminal in response to the first operation when the input source of the first operation is an input device of the first terminal. The first terminal is configured to: receive the data, and display the second interface on a display of the first terminal based on the data.

In a possible implementation, the first terminal is further configured to: when the user enters the first operation by using the input device of the first terminal, intercept a first input event corresponding to the first operation, and send a first operation parameter included in the first input event to second terminal.

In another possible implementation, that the second terminal is configured to receive a first operation of a user is specifically: The second terminal is configured to receive the first operation parameter from the first terminal, and simulate the first input event based on the first operation parameter. That the second terminal is configured to send data to the first terminal in response to the first operation is specifically: The second terminal is configured to determine, based on the simulated first input event, that the input source of the first operation is the input device of the first terminal, and send the data to the first terminal in response to the first input event.

In another possible implementation, the first terminal is further configured to: determine that a cursor displayed on the first terminal slides out of an edge of the display of the first terminal, and start input event interception.

In another possible implementation, that the second terminal is configured to display a second interface on a display of the second terminal in response to the first operation is specifically: The second terminal is configured to: when the user performs the first operation by using the input device of the second terminal, determine, based on a second input event corresponding to the first operation, that the input source of the first operation is the input device of the second terminal, and display the second interface on the display of the second terminal in response to the second input event.

In another possible implementation, after determining that the cursor displayed on the first terminal slides out of the edge of the display of the first terminal, the first terminal is further configured to send shuttle state information to the second terminal, where the shuttle state information is used to indicate that a shuttle of an input device starts.

In another possible implementation, the first terminal is specifically configured to: when the user enters the first operation by using the input device of the first terminal, intercept the first input event corresponding to the first operation, and send the first operation parameter included in the first input event to second terminal. The first operation parameter is used by the second terminal to simulate the first input event, to send data of the second interface to the first terminal.

It may be understood that for beneficial effects that can be achieved by the display apparatus according to the second aspect and any possible implementation of the third aspect, the display apparatus according to the fourth aspect and any possible implementation of the fourth aspect, the display apparatus according to the fifth aspect, the computer readable storage medium according to the sixth aspect, the electronic device according to the seventh aspect, the computer program product according to the eighth aspect, and the display system according to the ninth aspect, refer to beneficial effects in the first aspect, the third aspect, or any possible implementations of the first aspect or the third aspect. Details are not described herein again.

DESCRIPTION OF EMBODIMENTS

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

In the conventional technology, when multi screen collaboration is used to implement collaborative office of a plurality of terminals, for example, a PC and a mobile phone, a display interface of the mobile phone is always projected onto a display of the PC for display. Even if a user directly operates the mobile phone by using a touchscreen of the mobile phone, a display interface of the mobile phone is projected onto the display of the PC. However, when the user directly operates the mobile phone by using the touchscreen of the mobile phone, a focus or attention is on the mobile phone, and it is meaningless for the display of the PC to continue to display interface content of the mobile phone, and user privacy may be disclosed.

Embodiments of this application provide a display method and a device. The method may be used in a scenario in which a plurality of terminals are used collaboratively. In this scenario, on a premise that projection is not started, by using a keyboard and mouse sharing technology, an input device (for example, a mouse, a touchpad, or a keyboard) of a terminal (for example, referred to as a first terminal) may be used to control another terminal (for example, referred to as a second terminal). An input device of the second terminal may also be used. According to the method provided in this embodiment, when a user controls the second terminal by using the input device of the first terminal, the second terminal may project a corresponding interface onto the first terminal for display. When the user controls the second terminal by using the input device of the second terminal, the second terminal displays a corresponding interface, and does not project the corresponding interface onto the first terminal for display. In this way, the user can freely control, according to an actual requirement of the user, displaying of the interface of the second terminal on different devices. This not only protects user privacy, but also avoids the user from diverting attention, to improve user experience.

The following describes the implementations of embodiments of this application in detail with reference to accompanying drawings.

Figure 1:
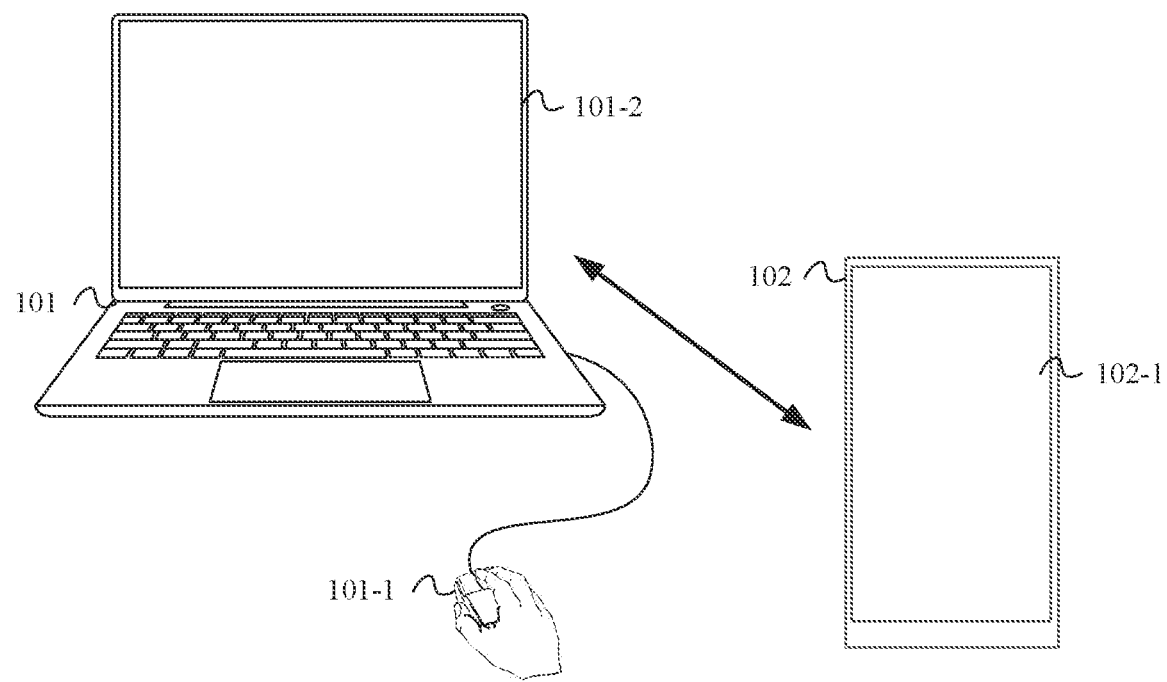
FIG. 1 is a simplified schematic diagram of a system architecture according to an embodiment of this application.

FIG. 1 is a simplified schematic diagram of a system architecture in which the method may be used according to an embodiment of this application. As shown in FIG. 1, the system architecture may include at least a first terminal 101 and a second terminal 102.

The first terminal 101 is connected to an input device 101-1 (as shown in FIG. 1), or includes an input device 101-1 (not shown in FIG. 1). In an example, the input device 101-1 may be a mouse, a touchpad, a keyboard, or the like. In FIG. 1, for example, the input device 101-1 is a mouse.

The second terminal 102 includes an input device 102-1 (as shown in FIG. 1), or is connected to an input device 102-1 (not shown in FIG. 1). In an example, in FIG. 1, the input device 102-1 is a touchscreen. When the input device 102-1 is a touchscreen, the touchscreen is also a display device or a display of the second terminal 102.

In this embodiment, the first terminal 101 and the second terminal 102 may establish a connection in a wired or wireless manner. Based on the established connection, the first terminal 101 and the second terminal 102 may be cooperatively used. In this embodiment, a wireless communication protocol used when the first terminal 101 and the second terminal 102 establish the connection in the wireless manner may be a wireless fidelity (wireless fidelity, Wi-Fi) protocol, a Bluetooth (Bluetooth) protocol, a ZigBee protocol, a near field communication (Near Field Communication. NFC) protocol, various cellular network protocols, or the like. This is not specifically limited herein.

After the first terminal 101 is connected to the second terminal 102, by using the keyboard and mouse sharing technology, a user may control both the first terminal 101 and the second terminal 102 by using one input device, for example, the input device 101-1. In other words, the user may not only control the first terminal 101 by using the input device 101-1 of the first terminal 101, but also share the input device 101-1 of the first terminal 101 with the second terminal 102, so that the user controls the second terminal 102. In addition, the user may alternatively control the second terminal 102 by using the input device 102-1 of the second terminal 102.

For example, in this embodiment, when the user controls the second terminal 102 by using the input device 101-1 of the first terminal 101, the second terminal 102 may project a corresponding interface onto a display 101-2 of the first terminal 101 for display. When the user controls the second terminal 102 by using the input device 102-1 of the second terminal 102, a corresponding interface is displayed on the touchscreen (or referred to as the display) of the second terminal 102, and the corresponding interface is not projected onto the display 101-2 of the first terminal 101.

For example, one or more applications are installed on the second terminal 102. The second terminal 102 may display an icon of a corresponding application on the touchscreen of the second terminal 102. In this embodiment, after the first terminal 101 and the second terminal 102 establish the connection, by using the keyboard and mouse sharing technology, the user may use the input device 101-1 to perform an operation, for example, a tap operation, on the icon of the application displayed on the touchscreen of the second terminal 102. In response to the tap operation, the second terminal 102 may project an interface of the application onto the display 101-2 of the first terminal 101 for display. The user may alternatively perform, by using the input device 102-1, an operation on the icon of the application displayed on the touchscreen of the second terminal 102. For example, the user performs a tap operation on the icon of the application by using a finger. In response to the tap operation, the second terminal 102 displays an interface of the application on the touchscreen of the second terminal 102, and the interface of the application is not projected onto the display 101-2 of the first terminal 101.

For another example, in this embodiment, after the user performs, by using the input device 101-1 of the first terminal 101, an operation such as a tap operation on an input box displayed on the touchscreen of the second terminal 102, the virtual keyboard is not displayed on the touchscreen of the second terminal 102, and the user may enter a character in the input box by using the keyboard (for example, a physical keyboard) of the first terminal 101. After the user performs, by using the input device 102-1 of the second terminal 102, an operation such as a tap operation on the input box displayed on the touchscreen of the second terminal 102, the second terminal 102 may display a virtual keyboard on the touchscreen of the second terminal 102, and the user may input a character in the input box by using the virtual keyboard.

It should be noted that, in embodiments of this application, the terminal such as the first terminal 101 or the second terminal 102 may be a mobile phone, a tablet computer, a handheld computer, a PC, a cellular phone, a personal digital assistant (personal digital assistant, PDA), a wearable device (for example, a smartwatch), a vehicle mounted computer, a game console, or an augmented reality (augmented reality, AR)/virtual reality (virtual reality, VR) device. A specific form of the terminal is not specially limited in embodiments. In FIG. 1, an example in which the first terminal 101 is a PC and the second terminal 102 is a mobile phone is described. In addition, in addition to the terminal (or the mobile terminal), the technical solution provided in embodiments may also be used in another electronic device, for example, a smart home device (for example, a television).

Figure 2A:
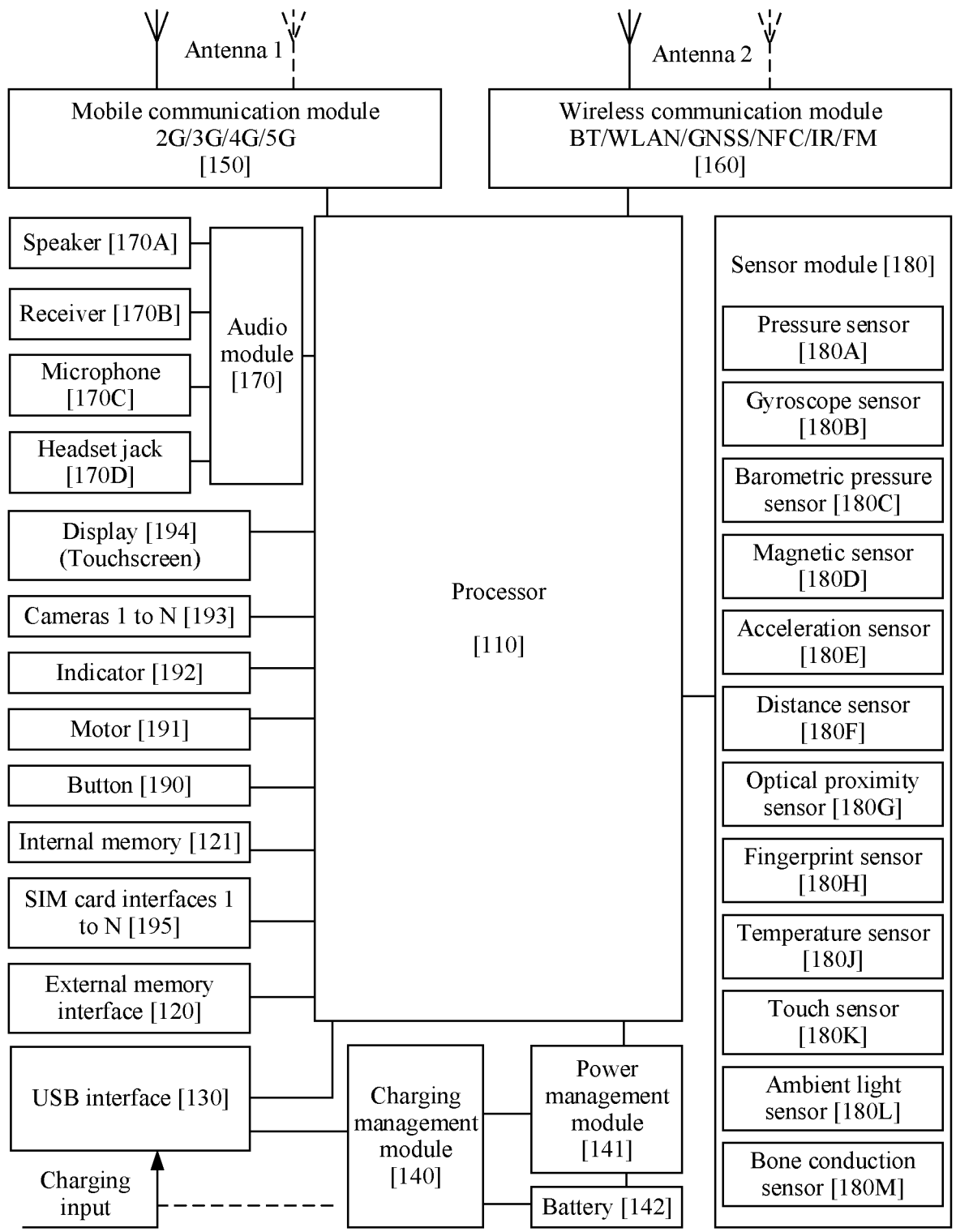
FIG. 2A is a schematic diagram of a structure of a mobile phone according to an embodiment of this application.

In this embodiment, an example in which the terminal is a mobile phone is used. FIG. 2A is a schematic diagram of a structure of a mobile phone according to an embodiment of this application.

As shown in FIG. 2A, the mobile phone may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M and the like.

It may be understood that the structure shown in embodiments constitutes no specific limitation on the mobile phone. In some other embodiments, the mobile phone may include more or fewer components than those shown in the figure, or some components nay be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural network processing unit, NPU). Different processing units may be independent components, or may be integrated into one or more processors.

The controller may be a nerve center and a command center of the mobile phone. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter integrated circuit (inter integrated circuit, I2C) interface, an inter-integrated circuit sound (inter integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIP1), a general purpose input/output (general purpose input/output, GPIO) interface, a SIM interface, a USB interface, and/or the like.

The charging management module 140 is configured to receive a charging input from the charger. The charging management module 140 may further supply power to the mobile phone by using the power management module 141 while charging the battery 142. The power management module 141 is configured to connect to the battery 142 and the charging management module 140 to the processor 110. The power management module 141 may also receive an input of the battery 142 to supply power to the mobile phone.

A wireless communication function of the mobile phone may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the mobile phone may be configured to cover one or more communication frequency bands Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution, applied to the mobile phone, to wireless communication including 2G, 3G, 4G, 5G, or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to be sent low frequency baseband signal into a medium high frequency signal. The demodulator is configured to demodulate a received electromagnetic wave signal into a low frequency baseband signal. Then, the demodulator transmits the low frequency baseband signal obtained through demodulation to the baseband processor for processing. The baseband processor processes the low frequency baseband signal, and then transmits a processed signal to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another function module.

The wireless communication module 160 may provide a solution that includes wireless communication such as a wireless local area network (wireless local area networks, WLAN) (for example, a Wi-Fi network), Bluetooth (Bluetooth, BT), a global navigation satellite system (global navigation satellite system, GNSS), frequency modulation (frequency modulation, FM), NFC, and an infrared (infrared, IR) technology and that is applied to the mobile phone. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to be sent signal from the processor 110, perform frequency modulation and amplification on the signal, and convert the signal into an electromagnetic wave for radiation through the antenna 2.

In some embodiments, in the mobile phone, the antenna 1 and the mobile communication module 150 are coupled, and the antenna 2 and the wireless communication module 160 are coupled, so that the mobile phone can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division code division multiple access (time division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi zenith satellite system (quasi zenith satellite system, QZSS), and/or a satellite based augmentation system (satellite based augmentation systems, SBAS).

The mobile phone implements a display function by using the GPU, the display 194, the application processor, and the like. The GPU is a microprocessor for image processing, and is connected to the display 194 and the application processor. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light emitting diode (organic light emitting diode, OLED), an active-matrix organic light emitting diode (active matrix organic light emitting diode, AMOLED), a flexible light emitting diode (flex light emitting diode, FLED), a mini-LED, a micro-LED, a micro-OLED, a quantum dot light emitting diode (quantum dot light emitting diodes, QLED), or the like. In some embodiments, the mobile phone may include one or N displays 194, where N is a positive integer greater than 1.

The mobile phone may implement a photographing function by using the ISP, a camera 193, the video codec, the GPU, the display 194, the application processor, and the like. In some embodiments, the mobile phone may include one or N cameras 193, where N is a positive integer greater than 1.

The external memory interface 120 may be configured to connect to an external memory card, for example, a micro SD card, to extend a storage capability of the mobile phone. The external memory card communicates with the processor 110 through the external memory interface 120, to implement a data storage function. For example, files such as music and videos are stored in the external storage card.

The internal memory 121 may be configured to store computer executable program code. The executable program code includes instructions. The processor 110 runs the instructions stored in the internal memory 121, to perform various function applications of the mobile phone and data processing. The internal memory 121 may include a program storage area and a data storage area. The program storage area may store an operating system, an application required by at least one function (for example, a sound playing function and an image playing function), and the like. The data storage region may store data (for example, audio data or a phone book) created when the mobile phone is used, and the like. In addition, the internal memory 121 may include a high speed random access memory, or may include a nonvolatile memory, for example, at least one magnetic disk storage device, a flash memory, or a universal flash storage (universal flash storage, UFS).

The mobile phone may implement an audio function by using the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. When a touch operation is performed on the display 194, the mobile phone detects intensity of the touch operation by using the pressure sensor 180A. The mobile phone may also calculate a touch location based on a detection signal of the pressure sensor 180A.

The gyroscope sensor 180B may be configured to determine a motion posture of the mobile phone. The barometric pressure sensor 180C is configured to measure barometric pressure. The magnetic sensor 180D includes a Hall effect sensor. The mobile phone may detect opening and closing of a flip cover by using the magnetic sensor 180D. The acceleration sensor 180E may detect magnitude of accelerations of the mobile phone in various directions (generally on three axes). The distance sensor 180F is configured to measure a distance. The mobile phone may detect, by using the optical proximity sensor 180G, that a user holds the mobile phone close to an ear to make a call, to automatically turn off a screen for power saving. The optical proximity sensor 180G may also be used in a smart cover mode or a pocket mode to automatically perform screen unlocking or locking. The ambient light sensor 180L is configured to sense ambient light luminance. The fingerprint sensor 180H is configured to collect a fingerprint. The mobile phone may use a feature of the collected fingerprint to implement fingerprint based unlocking, application lock access, fingerprint based photographing, fingerprint based call answering, and the like. The temperature sensor 180J is configured to detect a temperature.

The touch sensor 180K is also referred to as a touch panel. The touch sensor 180K may be disposed on the display 194, and the touch sensor 180K and the display 194 constitute a touchscreen, which is also referred to as a "touch screen". The touch sensor 180K is configured to detect a touch operation acting on or near the touch sensor 180K. The touch sensor may transfer the detected touch operation to the application processor, to determine a type of a touch event. A visual output related to the touch operation may be provided through the display 194. In some other embodiments, the touch sensor 180K may be alternatively disposed on a surface of the mobile phone and is at a location different from that of the display 194.

The bone conduction sensor 180M may obtain a vibration signal. The button 190 includes a power button, a volume button, and the like. The button 190 may be a mechanical button, or may be a touch button. The motor 191 may generate a vibration prompt. The motor 191 may be configured to produce an incoming call vibration prompt and a touch vibration feedback. The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the mobile phone. The mobile phone may support one or N SIM card interfaces, where N is a positive integer greater than 1. The mobile phone interacts with a network by using the SIM card, to implement functions such as calling and data communication. In some embodiments, the mobile phone uses an eSIM, namely, an embedded SIM card. The eSIM card may be embedded in the mobile phone, and cannot be separated from the mobile phone. Methods in the following embodiments may be implemented in a mobile phone having the foregoing hardware structure.

Figure 2B:
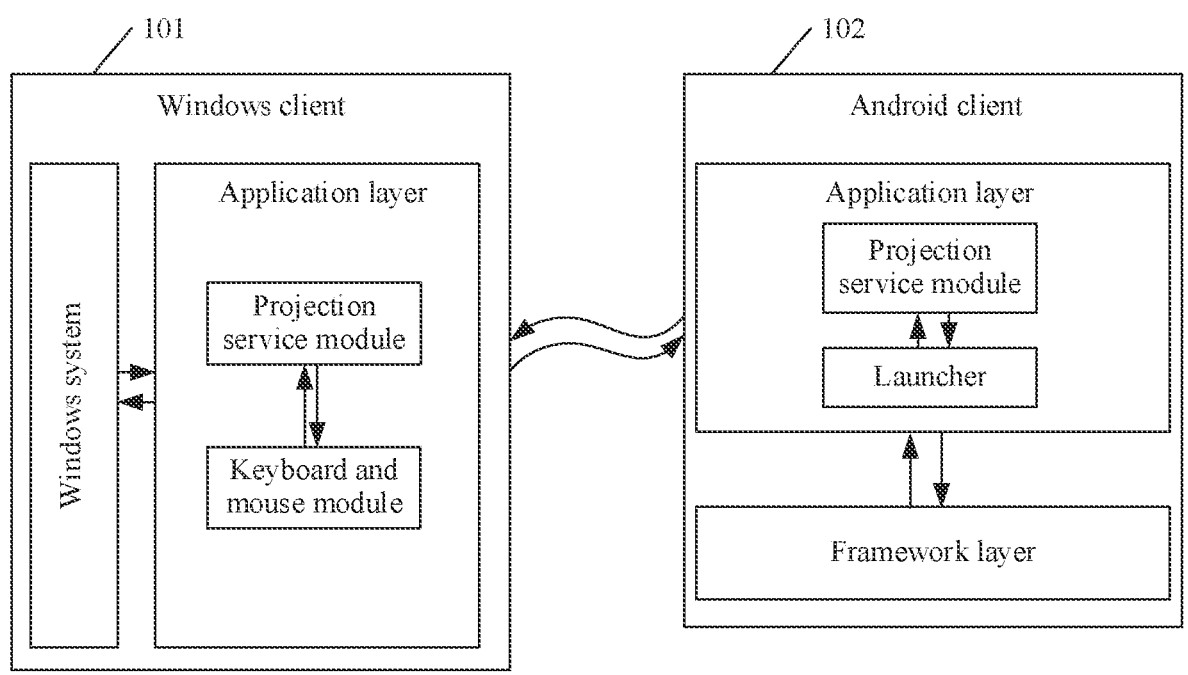
FIG. 2B is a schematic diagram of composition of a software architecture according to an embodiment of this application.

With reference to FIG. 1, in embodiments of this application, software architectures of the first terminal 101 and the second terminal 102 are described by using an example in which a software system of the first terminal 101 is the Windows system and a software system of the second terminal 102 is the Android system. FIG. 2B is a schematic diagram of composition of a software architecture according to an embodiment of this application.

As shown in FIG. 2B, the software architecture of the first terminal 101 may include an application layer and a Windows shell (windows shell). In some embodiments, the application layer may include applications installed on the first terminal 101. The applications at the application layer may directly interact with the Windows shell. For example, the application layer may further include a keyboard and mouse module and a projection service module.

A software system of the second terminal 102 may use a layered architecture, an event-driven architecture, a microkernel architecture, a micro service architecture, or a cloud architecture. For example, the software system of the second terminal 102 is a layered architecture. In the layered architecture, software is divided into several layers, and each layer has a clear role and task. The layers communicate with each other through a software interface. In some embodiments, as shown in FIG. 2B, the second terminal 102 may include an application layer and a framework layer (framework, FWK). The application layer may include a series of application packages. For example, the application package may include applications such as Settings, Calculator, Camera, Messages, Music, and Gallery. An application included in the application layer may be a system application of the second terminal 102, or may be a third party application. This is not specifically limited in embodiments of this application. The application layer may further include a projection service module. The application layer may further include a launcher. The framework layer is mainly responsible for providing an application programming interface (application programming interface, API) and a programming framework for the application at the application layer. Certainly, the second terminal 102 may further include another layer, such as a kernel layer (not shown in FIG. 2B). The kernel layer is a layer between hardware and software. The kernel layer includes at least a display driver, a camera driver, an audio driver, a sensor driver, and the like.

In a scenario in which a plurality of terminals are collaboratively used, a user may control the plurality of terminals by using a same input device, to improve use efficiency. With reference to FIG. 1, for example, the plurality of terminals include the first terminal 101 and the second terminal 102, the input device 101-1 of the first terminal 101 is a mouse, and the input device 102-1 of the second terminal 102 is a touchscreen. After the first terminal 101 and the second terminal 102 establish a connection, based on the foregoing software architecture and by using the keyboard and mouse sharing technology, the user may control the first terminal 101 and the second terminal 102 by using the mouse of the first terminal 101. The user may alternatively control the second terminal 102 by using the touchscreen of the second terminal 102. In this embodiment, when the user controls the second terminal 102 by using the mouse of the first terminal 101, the second terminal 102 may project a corresponding interface onto the first terminal 101 for display. When the user controls the second terminal 102 by using the touchscreen of the second terminal 102, the second terminal 102 displays the corresponding interface, and does not project the corresponding interface onto the first terminal 101.

The keyboard and mouse sharing technology may be a technology of controlling another terminal by using an input device (for example, a mouse, a touchpad, or a keyboard) of a terminal.

With reference to FIG. 1 and FIG. 2B, the following describes in detail the method provided in embodiments with reference to the accompanying drawings by using an example in which the first terminal 101 is a PC, the second terminal 102 is a mobile phone, the input device 101-1 is a mouse, and the input device 102-1 is a touchscreen.

Figure 3A:
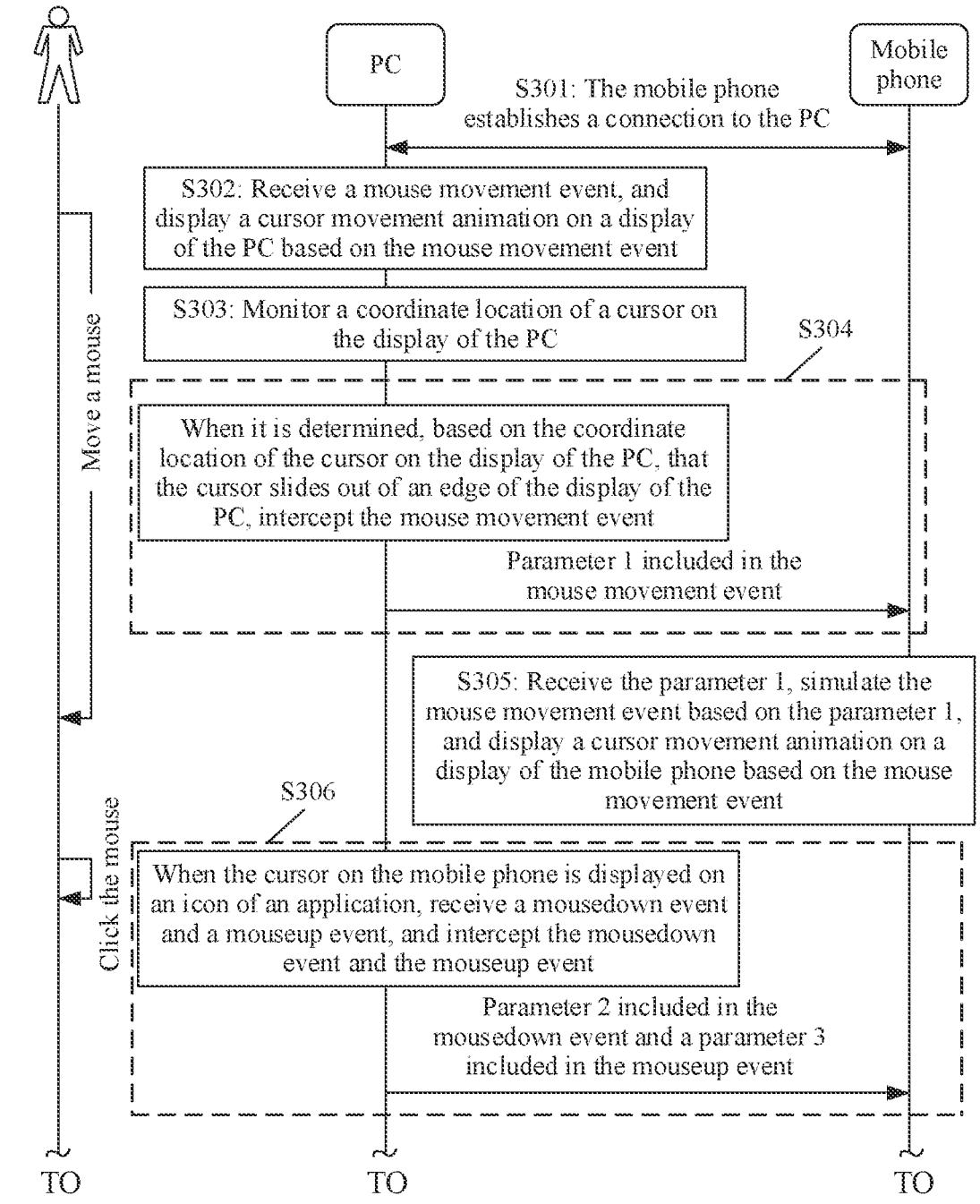
FIG. 3A and FIG. 3B are a schematic flowchart of a display method according to an embodiment of this application.
Figure 3B:
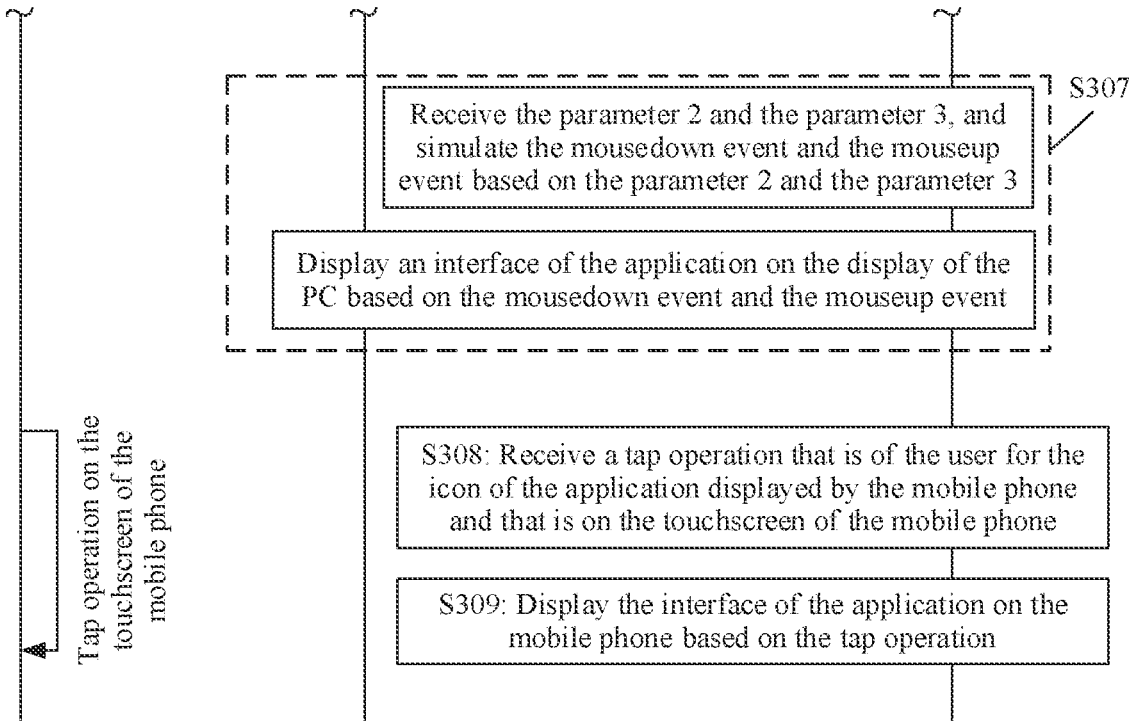

FIG. 3A and FIG. 3B are a schematic flowchart of a display method according to an embodiment of this application. As shown in FIG. 3A and FIG. 3B, the method may include S301 to S309.

S301: The mobile phone establishes a connection to the PC.

In some embodiments, the mobile phone may establish the connection to the PC in a wired manner. For example, the mobile phone may establish a wired connection to the PC through a data cable.

In some other embodiments, the mobile phone may establish the connection to the PC in a wireless manner.

There are two requirements for establishing the connection between terminals in a wireless manner. One is that the terminals know connection information of each other, and the other is that each terminal has a transmission capability. The connection information may be a device identifier of the terminal, for example, an internet protocol (internet protocol, IP) address, a port number, or a login account of the terminal. The account logged in on the terminal may be an account provided by an operator for the user, for example, a HUAWEI account. The account logged in on the terminal may also be an application account, for example, a WeChat® account or a Youku® account. The transmission capability of the terminal may be a near field communication capability, or may be a long distance communication capability. In other words, a wireless communication protocol used for establishing a connection between terminals may be a near field communication protocol such as a Wi-Fi protocol, a Bluetooth protocol, or an NFC protocol, or may be a cellular network protocol.

For example, the mobile phone and the PC are connected in a wireless manner. For example, the user may use the mobile phone to touch an NFC tag of the PC, and the mobile phone reads connection information stored in the NFC tag. For example, the connection information includes an IP address of the PC. Then, the mobile phone may establish the connection to the PC by using the NFC protocol based on the IP address of the PC. For another example, Bluetooth functions and Wi-Fi functions are enabled on both the mobile phone and the PC. The PC may broadcast a Bluetooth signal to discover a surrounding terminal. For example, the PC may display a list of discovered devices. The list of discovered devices may include an identifier of the mobile phone discovered by the PC. In a process of discovering a device, the PC may also exchange connection information, for example, an IP address, with the discovered device. Then, after the PC receives an operation of selecting the identifier of the mobile phone from the displayed device list by the user, the PC may establish, based on the IP address of the mobile phone, the connection to the mobile phone by using a Wi-Fi protocol. For another example, both the mobile phone and the PC are connected to a cellular network, and a same HUAWEI account is logged in on the mobile phone and the PC. The mobile phone may establish the connection to the PC based on the HUAWEI account and the cellular network.

After successfully establishing the connection, the mobile phone and the PC may be collaboratively used. To improve collaboration use efficiency, the user may use an input device, for example, the mouse of the PC, to control both the PC and the mobile phone. In other words, the user may use the input device of the PC to control the PC, and the PC may also share the input device of the PC with the mobile phone for the user to control the mobile phone.

In an example implementation, when the mobile phone is successfully connected to the PC, and a keyboard and mouse sharing mode of the PC is enabled, the PC and the mobile phone may be controlled by using one set of input devices.

For example, in some embodiments, after another terminal successfully establishes a connection to the PC, the PC may display a pop up window. The pop up window is used to ask the user whether to enable the keyboard and mouse sharing mode. If an operation of selecting, by the user, to enable the keyboard and mouse sharing mode is received, the PC may enable the keyboard and mouse sharing mode.

After enabling the keyboard and mouse sharing mode, the PC may notify all terminals establishing connections to the PC that the keyboard and mouse sharing mode is enabled. For example, the PC establishes the connection to the mobile phone. In this case, the PC notifies the mobile phone that the keyboard and mouse sharing mode is enabled. After receiving the notification (for example, referred to as a notification message), the mobile phone may create a virtual input device. The virtual input device has a same function as a conventional input device such as a mouse, a touchpad, or a keyboard, and may be used by the mobile phone to simulate a corresponding input event. For example, the input device is the mouse. The virtual input device created by the mobile phone has a same function as a conventional mouse, may be considered as a mouse shared by the PC with the mobile phone, and can be used to simulate a mouse event at the mobile phone end, to implement control of the mouse of the PC on the mobile phone.

For example, an operating system of the mobile phone is the Android system. The mobile phone may use a uinput capability of Linux to create the virtual input device, where uinput is a kernel layer module, and may simulate an input device. By writing/dev/uinput (or /dev/input/uinput) to a device, a process may create a virtual input device with a specific function. Once the virtual input device is created, the virtual input device may simulate a corresponding event. Similarly, the another terminal that establishes the connection to the PC also creates a virtual input device based on the received notification message.

It should be noted that, if an operating system of the terminal that receives the notification message is the Android system, the virtual input device may be created by using a uinput capability of Linux, or the virtual input device may be created by using the human interface device (human interface device, HID) protocol. If an operating system of the terminal that receives the notification message is another operating system, for example, the iOS system or the Windows system, the virtual input device may be created by using the HID protocol. In addition, in the foregoing embodiment, for example, the terminal that establishes the connection to the PC creates the virtual input device after receiving the notification message used to notify that the keyboard and mouse sharing mode of the PC is enabled. In some other embodiments, after receiving the notification message, the terminal that is connected to the PC may alternatively display a pop up window to ask the user whether the user wants to use the input device of the PC to control this device. If an operation of selecting, by the user, to use the input device of the PC to control this device is received, the virtual input device is created. Otherwise, the virtual input device is not created.

For another example, in some other embodiments, for example, after the mobile phone establishes the connection to the PC, the PC automatically enables the keyboard and mouse sharing mode, and the user does not need to manually enable the keyboard and mouse sharing mode. For example, after another terminal such as the mobile phone establishes a connection to the PC, may also automatically create a virtual input device, and the PC does not need to send a notification message. Alternatively, after establishing a connection to the PC, another terminal may first display a pop up window to ask the user whether the user wants to use the input device of the PC to control this device. Then, if an operation of selecting, by the user, to use the input device of the PC to control this device is received, a virtual input device is automatically created. Otherwise, a virtual input device is not created.

In the foregoing embodiment, an example in which the PC establishes the connection to the mobile phone, and then the PC enables the keyboard and mouse sharing mode is used for description. For another example, in some other embodiments, the PC may also first start the keyboard and mouse sharing mode. For example, the keyboard and mouse sharing mode may be manually enabled by the user, or may be automatically enabled by the PC. The keyboard and mouse sharing mode is enabled on the PC, and then the PC establishes the connection to the mobile phone. An implementation of establishing the connection to the mobile phone by the PC is the same as implementation described in the foregoing embodiment. Details are not described herein again. After the mobile phone establishes the connection to the PC, the mobile phone may create the virtual input device automatically or based on a notification message from the PC or based on selection of the user.

After the keyboard and mouse sharing mode of the PC is enabled, the PC has established the connection to the mobile phone, and the virtual input device of the mobile phone is created, it may be considered that the PC shares the input device of the PC with the mobile phone, and the user may control the mobile phone by using the input device of the PC.

With reference to FIG. 1, because the mouse is the input device of the PC, after the another terminal such as the mobile phone establishes the connection to the PC, generally, the PC temporarily responds to an operation of the mouse, or in other words, the user may temporarily control the PC by using the mouse. In this embodiment, after enabling the keyboard and mouse sharing mode, the PC may further trigger, when determining that a mouse shuttle condition is met, the another terminal such as the mobile phone that creates the virtual input device and that establishes the connection to the PC, to respond to the operation of the mouse. In other words, after the mouse shuttle condition is met, the user may use the mouse to control the mother terminal such as the mobile phone that creates the virtual input device and that establishes the connection to the PC.

For example, the mouse shuttle condition may be that a cursor displayed on a display of the PC slides over an edge of the display of the PC. In other words, the user may move the mouse, so that the cursor displayed on the display of the PC slides over the edge of the display of the PC, to trigger another terminal that establishes a connection to the PC and that creates the virtual input device to respond to the operation of the mouse.

In an example implementation, after enabling the keyboard and mouse sharing mode, the PC may enable input (input) monitor and mount a hook (HOOK). The input monitor may be used to monitor relative displacement and a coordinate location of a cursor. The input monitor may also be used to monitor to a keyboard event. After a mouse shuttle starts, the mounted hook may be used to intercept a corresponding input event (or shield a corresponding input event). For example, the input device is the mouse. The input event may be a mouse event. The mounted hook may be used to intercept the mouse event after the mouse shuttle starts. In this way, the mouse event is not transmitted to the Windows system of the PC after being received by a keyboard and mouse module of the PC. The mounted hook may also be used to capture a parameter in the intercepted input event such as the mouse event after the mouse shuttle starts. For example, the PC may listen to the relative displacement and the coordinate location of the cursor by using input monitor, and determine, based on monitored data, whether a mouse shuttle condition is met. After it is determined that the mouse shuttle condition is met, the mounted hook intercepts a mouse event, captures a parameter in the mouse event, and sends the captured parameter to another terminal that is connected to the PC and that creates a virtual input device, so that the terminal simulates, by using the created virtual input device, the corresponding input event such as a mouse event, to respond to the event. That is, the another terminal that is connected to the PC and that creates the virtual input device responds to an operation for the mouse.

Certainly, another manner (for example, registering RAWINPUT in the PC) may also be used to intercept the input event and capture the parameter in the input event. Alternatively, different manners may also be separately used to intercept the input event and capture the parameter in the input event. For example, the input device is the mouse. After enabling the keyboard and mouse sharing mode, the PC may mount the hook and register RAWINPUT. After the mouse shuttle starts, the mounted hook may be used to intercept the mouse event (or shield the mouse event), and registered RAWINPUT may be used to capture the parameter in the intercepted mouse event. A specific implementation of intercepting the mouse event and capturing the parameter in the mouse event is not limited herein in this embodiment. For ease of description, the following embodiments are described by using an example the hook is mounted to intercept the input event and capture the parameter in the input event.

It should be noted that in the foregoing embodiment, an example in which the user may control the mobile phone by using the input device of the PC only after the cursor displayed on the display of the PC slides over the edge of the display of the PC is used for description. In some other embodiments, the PC has established the connection to the mobile phone, the keyboard and mouse sharing mode of the PC is enabled, the mobile phone creates the virtual input device, and then the user may control the mobile phone by using the input device of the PC, that is, after the connection is established between the PC and the mobile phone, the keyboard and mouse sharing mode of the PC is enabled and the mobile phone creates the virtual input device, if the user operates the input device such as the mouse of the PC, the PC may intercept a corresponding input event, capture an operation parameter in the input event, and send the operation parameter to the mobile phone, to control the mobile phone by using the input device of the PC. In the following embodiment, an example in which the user may control the mobile phone by using the input device of the PC after the cursor displayed on the display of the PC slides over the edge of the display of the PC is used for description.

It may be understood that, when the PC shares the input device of the PC with the mobile phone, the user may control the mobile phone by using the input device of the PC, and nay control the mobile phone by using the input device of the mobile phone. In this embodiment, different input devices that control the mobile phone may correspond to different corresponding interfaces displayed on the terminal.

For example, the user controls the mobile phone by using the input device of the PC. The method may include S302 to S307.

S302: The PC receives a mouse movement event, and displays a cursor movement animation on the display of the PC based on the mouse movement event.

It should be noted that the cursor in this embodiment may also be referred to as a mouse pointer. The cursor may be an image, which may be dynamic or static, and the cursor style may also be different in different cases.

S303: The PC monitors a coordinate location of the cursor on the display of the PC.

S304: When determining, based on the coordinate location of the cursor on the display of the PC, that the cursor slides out of the edge of the display of the PC, the PC intercepts the mouse movement event, and sends a parameter 1 included in the mouse movement event to the mobile phone.

In this embodiment, after the keyboard and mouse sharing mode is enabled, when the user wants to control, by using the mouse, the another terminal that is connected to the PC and that creates the virtual input device, for example, when the user wants to operate a current display interface of the mobile phone, the user may continuously move the mouse in a same direction, so that the cursor displayed on the display of the PC slides over (or slides out of) the edge of the display of the PC, that is, the mouse shuttle condition is triggered.

For example, the PC may determine the coordinate location of the cursor on the display of the PC based on an initial location and relative displacement of the cursor, to determine whether the cursor slides out of the edge of the display of the PC.

The initial location of the cursor may be a coordinate location of the cursor on the display of the PC when the mouse starts to move, or in other words, a coordinate location of the cursor on the display of the PC before the mouse starts to move. The initial location of the cursor may be specifically a coordinate location in a coordinate system in which the upper left corner of the display of the PC is used as a coordinate origin, an X axis points from the upper left corner to the right edge of the display of the PC, and a Y axis points from the upper left corner to the lower edge of the display of the PC.

Figure 4:
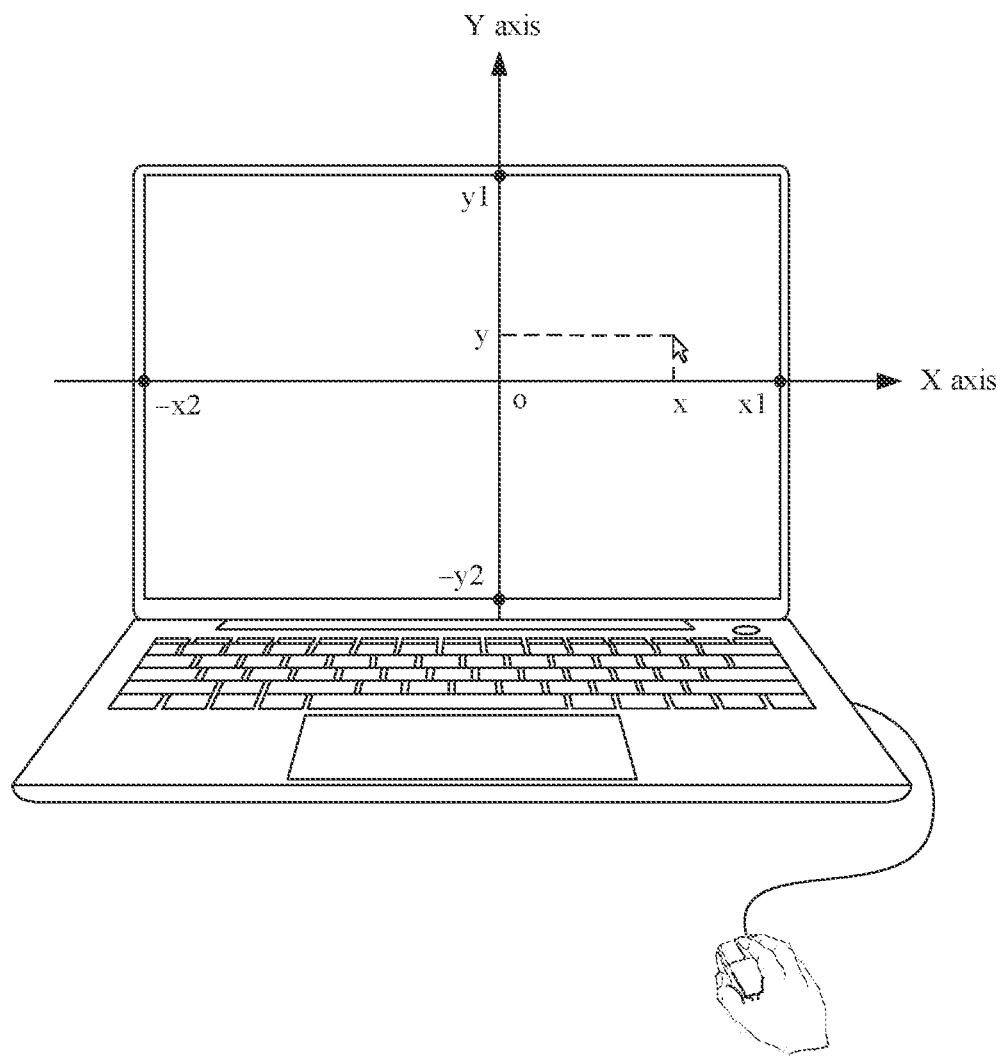
FIG. 4 is a schematic diagram of a coordinate system on a display according to an embodiment of this application.

For example, a specific process in which the PC determines whether the cursor slides out of the edge of the display of the PC may be as follows: With reference to FIG. 4, the PC may establish a coordinate system in which the initial coordinate location is used as a coordinate origin (for example, a location o shown in FIG. 4), an X axis points from the coordinate origin o to the right edge of the display of the PC, and a Y axis points from the coordinate origin o to the upper edge of the display of the PC. The PC may determine a coordinate value of each edge of the display of the PC in the coordinate system. The coordinate value of each edge of the display of the PC in the coordinate system may be determined based on resolution of the display of the PC and the initial location of the cursor. For example, as shown in FIG. 4, in the coordinate system, a coordinate value of the right edge of the display of the PC on the X axis is x1, a coordinate value of the left edge of the display of the PC on the X axis is −x2, a coordinate value of the upper edge of the display of the PC on the Y axis is y1, and a coordinate value of the lower edge of the display of the PC on the Y axis is −y2. After the mouse is moved, the relative displacement of the cursor is reported to the PC. The PC may calculate, based on the relative displacement reported by the mouse, a coordinate location (x, y) of the cursor on the display of the PC after the mouse moves. The PC may determine, based on the coordinate location (x, y), whether the cursor slides out of the edge of the display of the PC. For example, if a coordinate value x of the cursor on the X axis is greater than x1, it may be determined that the cursor slides out of the right edge of the display of the PC. If a coordinate value x of the cursor on the X axis is less than −x2, it may be determined that the cursor slides out of the left edge of the display of the PC. If a coordinate value y of the cursor on the Y axis is greater than v, it may be determined that the cursor slides out of the upper edge of the display of the PC. If a coordinate value y of the cursor on the Y axis is less than −y2, it may be determined that the cursor slides out of the lower edge of the display of the PC.

After it is determined that the cursor slides out of the edge of the display of the PC, that is, the mouse shuttle condition is triggered, the user may perform an operation on the another terminal by using the input device of the PC. For example, after the cursor slides out of the edge of the display of the PC, if the user continues to operate the input device such as the mouse of the PC, the PC may send, to the another terminal that creates the virtual input device, data about the operation that is input by the user by using the input device of the PC, or, shuttle the mouse to the terminal. For example, after the cursor slides out of the edge of the display of the PC, the user inputs an operation by using the input device of the PC, and the PC may intercept the input event corresponding to the operation, such as a mouse movement event, a mousedown event, or a mouseup event, and transmit the parameter included in the intercepted input event to the another terminal that is connected to the PC and that creates the virtual input device, so that the terminal responds to the operation for the input device such as the mouse of the PC.

For example, the PC may determine, in the following manner, a device to which the mouse shuttles.

In some embodiments, if only one device is connected to the PC, for example, the mobile phone, and the mobile phone creates the virtual input device, the PC may determine that the mouse shuttles to the mobile phone, that is, the PC transmits the corresponding operation parameter to the mobile phone, so that the mobile phone responds to the operation on the input device such as the mouse of the PC. If a plurality of devices are connected to the PC, and some or all of the plurality of devices create virtual input devices, the PC may display a list option on the display of the PC when determining that the mouse shuttle condition is triggered. The list option includes an identifier of the device that creates the virtual input device in the devices that are connected to the PC (for example, includes an identifier of the mobile phone). The PC may determine, based on selection of the user, the device to which the mouse shuttles, that is, determine a device that responds to an operation on the input device of the PC. If the user selects the identifier of the mobile phone, the PC determines that the mouse shuttles to the mobile phone, that is, the PC may send a corresponding parameter to the mobile phone, so that the mobile phone responds to the operation on the input device of the PC. After receiving the corresponding operation parameter, the mobile phone may simulate the corresponding input event, for example, the mouse event, and correspondingly responds, that is, the mobile phone responds to the operation on the input device of the PC. In this embodiment, after creating the virtual input device, the device that is connected to the PC may send, to the PC, an indication message indicating that the virtual input device is successfully created. The PC may obtain, based on the received indication message, which devices in the devices that are connected to the PC successfully create the virtual input devices, and display the list option based on the received indication message.

In some other embodiments, a shuttle relationship may be pre configured. If a plurality of devices are connected to the PC, and some or all of the plurality of devices create virtual input devices, a device to which the mouse shuttles may be determined based on the pre configured shuttle relationship, that is, a device which responds to the operation of the input device of the PC may be determined. For example, the plurality of devices that are connected to the PC include the mobile phone, and the mobile phone creates the virtual input device. A pre configured shuttle relationship is that the cursor slides out from the left side (or the left edge) of the display of the PC, and the mouse shuttles to the mobile phone. In this case, when the user moves the mouse to enable the cursor to slide over the left edge of the display of the PC, the PC may not only determine that a mouse shuttle starts, but also determine that the mouse shuttles to the mobile phone. To be specific, the PC may send a corresponding operation parameter to the mobile phone, so that the mobile phone responds to the operation on the input device of the PC. Certainly, if one device is connected to the PC, and the device creates a virtual input device, whether the mouse shuttles to the device may be also determined based on a pre configured shuttle relationship. For example, the pre configured shuttle relationship is that the cursor slides out of the left edge of the display of the PC. In this case, the mouse shuttles to the mobile phone. However, after the user moves the mouse to enable the cursor to slide over the right edge of the display of the PC, it may be determined that the mouse does not shuttle to the mobile phone. In some other embodiments, a device to which the mouse shuttles may be determined by identifying a device location. For example, the input device is the mouse. The user presses and moves the mouse, so that the cursor slides over the left edge of the display of the PC. In this case, a positioning technology, for example, Bluetooth, ultra wideband (Ultra wideband, UWB), or an ultrasonic wave, may be used to identify a device location around the PC. For example, the PC identifies that the mobile phone is on the left of the PC, it may be determined that the mouse shuttles to the mobile phone.

The shuttle relationship may be configured in advance by the user by using a configuration file, or a configuration interface for configuring the shuttle relationship may be provided for the user, and the user may configure the shuttle relationship in advance by using the configuration interface. For example, the user configures a shuttle relationship of the mobile phone by using an interface. The PC receives an operation of opening a configuration interface by the user, and displays the configuration interface. The configuration interface includes an identifier of the PC (for example, an icon of the PC) and the identifier of the mobile phone (for example, an icon of the mobile phone). The user may configure the shuttle relationship by dragging the two identifiers. In an example, if the user places the identifier of the mobile phone on the left side of the identifier of the PC, the PC may determine that the mouse shuttles to the mobile phone when the cursor slides over the left edge of the display of the PC. If the user places the identifier of the mobile phone on the right side of the identifier of the PC, the PC may determine that the mouse shuttles to the mobile phone when the cursor slides over the right edge of the display of the PC. When there are a plurality of devices, a shuttle relationship of each device may be configured in a pre configuration manner. In the following embodiments, an example in which it is determined that the mouse shuttles to the mobile phone is used for description. It should be noted that, for the two implementations of determining, based on the pre configured shuttle relationship and the identified device location, the device to which the mouse shuttles, S301 may be performed before the mouse shuttle is triggered, or may be performed after the mouse shuttle is triggered. This is not specifically limited herein in this embodiment.

In this embodiment, the parameter included in the input event may include an operation parameter. For example, the input event is a mouse event. The operation parameter (or referred to as a mouse operation parameter) included in the mouse event may include a mouse button flag bit, coordinate information, scroll wheel information, and button location information. The mouse button flag bit is used to indicate an operation performed by the user on the mouse, for example, pressing, lifting, moving, or scroll wheel scrolling. The coordinate information is used to indicate the X coordinate and Y coordinate of the cursor when the user moves the mouse. The scroll wheel information is used to indicate an X-axis distance and a Y-axis distance at which a scroll wheel scrolls when the user operates the scroll wheel of the mouse. The button location information is used to indicate which button of a left button, a middle button, or a right button of the mouse is operated by the user.

Figure 5:
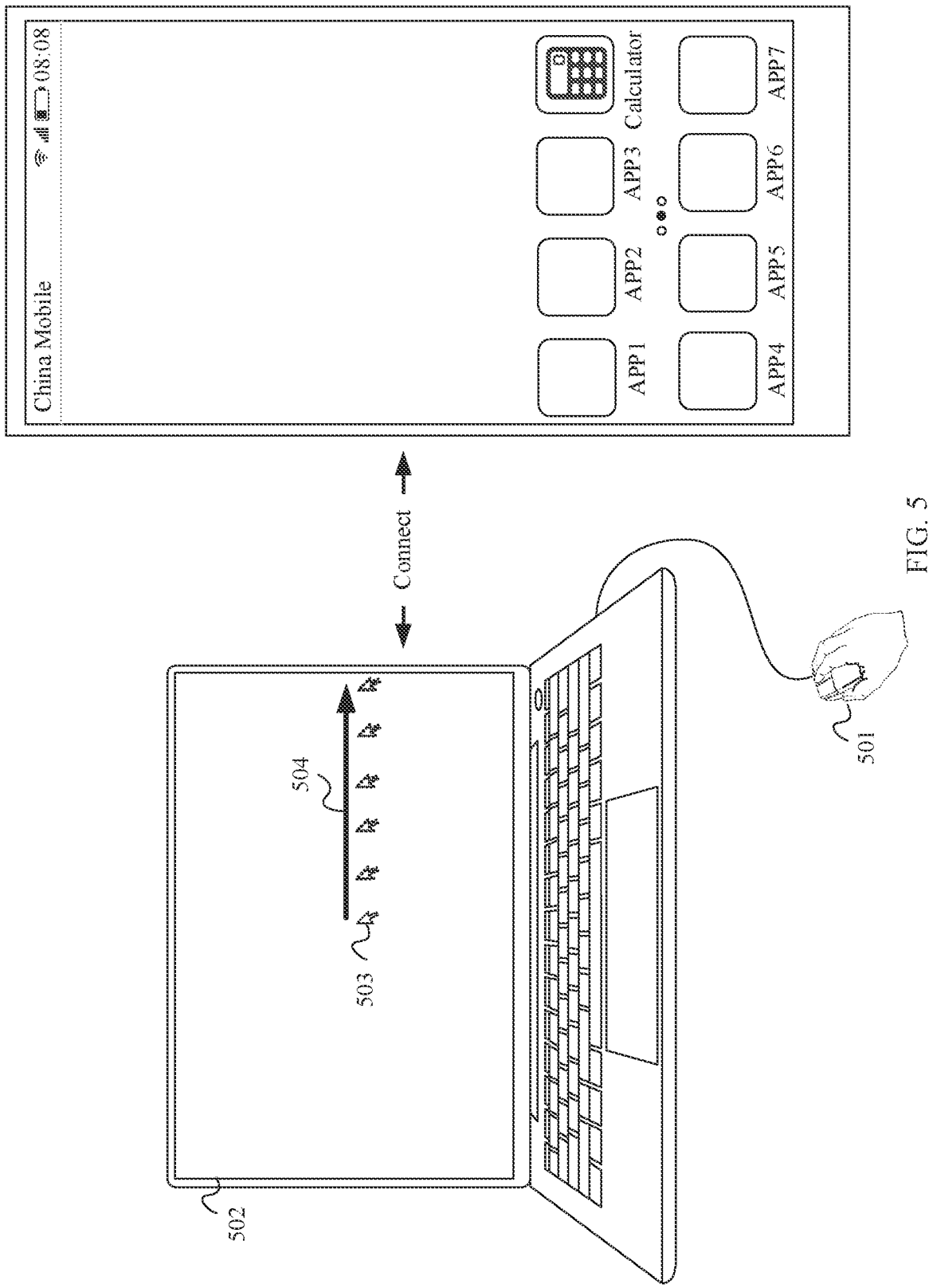
FIG. 5 is a schematic diagram of a display interface according to an embodiment of this application.

For example, the input device of the PC is the mouse. With reference to FIG. 2B, S302 to S304 are described by using an example. When the user wants to operate the mobile phone by using the mouse of the PC, the user may move the mouse of the PC. In a process in which the user moves the mouse of the PC, the keyboard and mouse module of the PC may receive a corresponding input event, for example, a movement event. The movement event may be referred to as a mouse movement event. In this case, because the mouse shuttle condition is not triggered, the hook does not intercept the mouse movement event. The mouse movement event is transmitted to the Windows system of the PC. Based on the received mouse movement event, the Windows system of the PC may draw a cursor movement animation and display the animation on the display of the PC. For example, as shown in FIG. 5, as a mouse 501 moves, the PC correspondingly displays, on a display 502 of the PC, an animation indicating that a cursor 503 moves. A movement track of the cursor 503 shown in FIG. 5 is shown as a track 504.

As described in S301, after the keyboard and mouse sharing mode is enabled, the PC enables input monitor and mounts the hook. In a process in which the cursor moves on the display of the PC, the keyboard and mouse module of the PC may monitor a real time coordinate location of the cursor on the display of the PC through input monitor. When the keyboard and mouse module of the PC determines, based on the monitored real time coordinate location of the cursor on the display of the PC, that the cursor slides over the edge of the display of the PC, it may be determined that the mouse shuttle condition is met, and it indicates that the user wants to control the another terminal by using the mouse of the PC. The keyboard and mouse module of the PC may determine that the mouse shuttle starts.

After the keyboard and mouse module of the PC determines that the mouse shuttle starts, if the user performs an operation on the mouse of the PC, the keyboard and mouse module of the PC intercepts a received input event, for example, a mouse event, by using the hook, and captures, by using the hook, a parameter in the intercepted input event. Then, the PC may transmit the parameter to the mobile phone through the established connection, so that the mobile phone makes a corresponding response. For example, still with reference to the example shown in FIG. 5, after the cursor slides over the edge of the display of the PC, the user continues to move the mouse in the same direction. The keyboard and mouse module of the PC may receive a movement event, for example, a mouse movement event. Because the mouse shuttle has started, the mouse and keyboard module of the PC may intercept (or shield) the mouse shuttle by using the hook, so that the mouse movement event is not sent to the Windows system of the PC, and the PC does not respond to the received mouse movement event. The mouse and keyboard module of the PC may further capture a parameter in the mouse movement event by using the hook. For example, the parameter is referred to as a parameter 1. Then, the PC may send the parameter 1 to the mobile phone through the established connection. In an example, the parameter 1 included in the mouse movement event may include an operation parameter 1. The operation parameter 1 may include: a mouse button flag bit used to indicate that the user moves the mouse, coordinate information used to indicate X coordinates and Y coordinates of the cursor movement, scroll wheel information (a value is empty), and button location information (a value is empty).

In addition, in this embodiment, after it is determined that the mouse shuttle starts, the PC may further send, to the mobile phone through the established connection, shuttle state information used to indicate that the mouse shuttle starts. In other words, the shuttle state information is used to indicate the mobile phone to start to accept input from the input device of the PC. After receiving the information, the mobile phone may simulate a cursor, and display the cursor on the display of the mobile phone. For example, after receiving the information, the mobile phone may create the cursor, and deliver the cursor to a launcher of the mobile phone to display the cursor. After determining that the mouse shuttle starts, the PC may also hide the cursor displayed on the display of the PC. This gives the user a visual effect of the cursor shuttle from the PC to the mobile phone.

A location at which the mobile phone displays the cursor may be predefined, for example, may be any location on the display of the mobile phone. The location at which the mobile phone displays the cursor may also correspond to a location at which the cursor slides out on the PC. For example, if the cursor slides out of the right edge of the display of the PC, the cursor is displayed on the left edge of the display of mobile phone. For another example, if the cursor slides out from a center location of the right edge of the display of the PC, the cursor is displayed in a center location of the left edge of the display of the mobile phone. In an example, after the cursor slides out of the display of the PC, the PC may send, to the mobile phone, a coordinate location of the cursor on the display of the PC when the cursor slides out of the display of the PC. The mobile phone may determine, based on the coordinate location and resolution (for example, A×B) of the PC, an edge from which the cursor slides out of the display of the PC. For example, when the cursor slides out of the display of the PC, coordinates are (x1, y1), where y1 is equal to A, the mobile phone may determine that the cursor slides out of the right edge of the display of the PC. The mobile phone may further determine, based on x1 and resolution (for example, a height B) of the PC, a proportion of the location at which the cursor slides out of the display of the PC to a height of the mobile phone. Based on the proportion and resolution of the mobile phone, a specific location at which the cursor is displayed on the right edge may be determined. The resolution of the PC may be sent by the PC to the mobile phone in a process of establishing the connection to the mobile phone or after the connection is established successfully.

S305: The mobile phone receives the parameter 1, simulates the mouse movement event based on the parameter 1, and displays the cursor movement animation on a display of the mobile phone based on the mouse movement event.

As described above, the purpose of triggering the cursor to shuttle from the PC to the mobile phone is to control the mobile phone. Therefore, after the user shuttles, by using moving the mouse, the cursor from the display of the PC to the display of the mobile phone, the user may continue to move the mouse, that is, the user inputs, by using the mouse of the PC, an operation of moving the cursor on the mobile phone. In a process in which the user continues to move the mouse of the PC, the mobile phone receives a corresponding parameter, for example, the parameter 1 included in the mouse movement event. After receiving the parameter 1, the mobile phone may simulate a movement event, for example, the mouse movement event, based on an operation parameter included in the parameter 1. In response to the mouse movement event, the mobile phone may draw the cursor movement animation and display the animation on the display of the mobile phone until the cursor moves to a location, that the user wants to operate, on the display of the mobile phone. For example, the mobile phone currently displays a first interface, and the first interface includes one or more of content. The content on the first interface may be an element displayed on the first interface. The content may be an element that can be operated by the user, for example, a control. For example, content that the user wants to operate is a control. The user may continue to move the mouse of the PC, so that the cursor on the mobile phone moves to a location of the control.

In addition, in this embodiment, before the user controls the mobile phone by using the mouse of the PC, a display interface on the mobile phone may have been projected onto the display of the PC, or may not be projected onto the PC, and is displayed only on the mobile phone. It may be understood that, after the mouse shuttles to the mobile phone, the operation performed by the user by using the mouse of the PC may be used only to move the cursor on the mobile phone, and does not cause a change on the display interface of the mobile phone. For example, still with reference to the foregoing example, after the mouse shuttles to the mobile phone, the user continues to move the mouse, and the mobile phone may simulate the mouse movement event. In response to the obtained mouse movement event through simulation, the mobile phone may display the movement animation of the cursor, and the display interface of the mobile phone does not change. When the display interface of the mobile phone does not change in response to the input event, the mobile phone may continue to maintain a current display policy. For example, if the mobile phone projects the interface onto the PC before the user controls the mobile phone by using the mouse of the PC, the mobile phone may continue to project the interface onto the PC. For another example, if the mobile phone does not project the interface onto the PC before the user controls the mobile phone by using the mouse of the PC, the mobile phone may continue to display the interface only on the mobile phone.

The following uses an example in which the mobile phone does not project the interface onto the PC before the user controls the mobile phone by using the mouse of the PC for description.

For example, the user wants to open an application on the mobile phone. For example, the first interface is a desktop, and the content that the user wants to operate is an icon of the application on the desktop. Generally, for applications installed on the mobile phone, the mobile phone may display icons of these applications on the desktop (or referred to as a home screen (home screen)) of the mobile phone. After the user shuttles, by moving the mouse, the cursor from the display of the PC to the display of the mobile phone, the user may continue to move the mouse until the cursor moves to a location of the icon that is of the application that the user wants to open and that is displayed on the display of the mobile phone.

It should be noted that the application described in this embodiment may be an embedded application (namely, a system application of the mobile phone, for example, a calculator, a camera, a setting, or a gallery), or may be a downloadable application (for example, a browser, a weather application, and an email). The embedded application is an application provided as a part of an implementation of the mobile phone. The downloadable application is an application that may provide an Internet Protocol multimedia subsystem (internet protocol multimedia subsystem. IMS) connection of the downloadable application. The downloadable application may be an application preinstalled on the mobile phone, or may be a third party application downloaded and installed by the user on the mobile phone.

Figure 6:
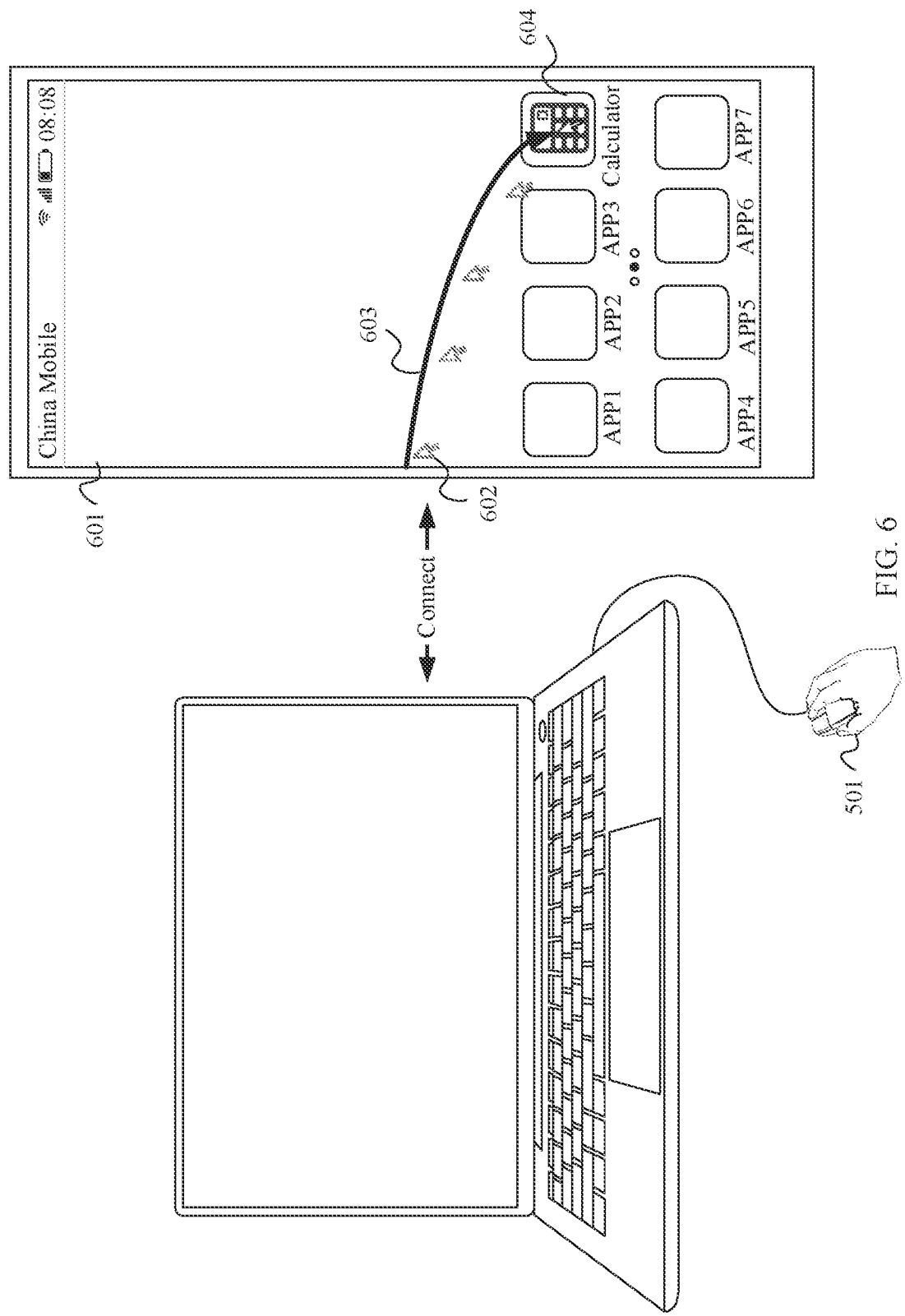
FIG. 6 is a schematic diagram of another display interface according to an embodiment of this application.

For example, the input device of the PC is the mouse. With reference to FIG. 2B, S305 is described by using an example. Because the operating systems of the PC and the mobile phone are different, button values in operation parameters in input events, for example, mouse events, of the PC and the mobile phone are different. After the mobile phone receives the corresponding parameter, for example, the parameter 1, the mobile phone may convert, based on a preset mapping relationship, a button bit code of an operation parameter 1 in the received parameter 1 into a button bit code that can be identified by the mobile phone. Then, the mobile phone may simulate, by using the created virtual input device and based on the operation parameter 1 obtained after the button bit code is converted, an input event that can be identified by the mobile phone, for example, the corresponding mouse event, that is, may simulate the movement event, for example, the mouse movement event. The mobile phone may draw a cursor movement animation based on the simulated mouse movement event, and send the cursor movement animation to a launcher of the mobile phone, so that the launcher of the mobile phone displays the cursor movement animation on the display of the mobile phone. For example, as shown in FIG. 6, an application that the user wants to open is a calculator on the mobile phone. As a mouse 501 moves, the mobile phone correspondingly displays, on a display 601 of the mobile phone, an animation in which a cursor 602 moves. For example, a movement track of the cursor 602 is shown as a track 603. That is, as the mouse 501 moves, the cursor 602 may move along the track 603 to a position of an icon 604 of the calculator. In addition, the display interface of the mobile phone does not change in a process of moving the cursor 602. As described above, the mobile phone may determine to continue to maintain the current display policy, that is, continue to display the current interface and the cursor movement animation on the mobile phone, and do not project content on the interface of the mobile phone onto the PC for display.

After the cursor moves to a location to be operated, that is, the cursor moves to a location of content to be operated on in the first interface, for example, the location of the icon of the application that the user wants to open, the user may input a corresponding operation by using the input device of the PC, where the operation may be referred to as a first operation. For example, the first operation may be a click operation, so that the mobile phone may start the application based on the first operation. It may be understood that, after the user performs the first operation by using the input device of the PC, the PC (for example, a keyboard and mouse module of the PC) may receive a corresponding input event, for example, referred to as a first input event. The first operation may include one operation, or may include a plurality of operations. If the first operation includes one operation, the first input event includes one input event. If the first operation includes a plurality of operations, the first input event includes a corresponding quantity of input events. For example, the input device of the PC is the mouse, and the first operation is the click operation. When the user inputs the click operation by using the mouse, the click operation may include two operations: a press operation and a release operation, and the corresponding first input event includes a press event and a release event. In an example, the press operation may be a mousedown operation, the release operation may be a mouseup operation, the press event may be a mousedown event, and the release event may be a mouseup event. On the basis of this, a process in which the user opens the application on the mobile phone by using the mouse of the PC may include S306 and S307.

S306: When the cursor on the mobile phone is displayed on the icon of the application, the PC receives the mousedown event and the mouseup event, and intercepts the mousedown event and the mouseup event, and sends a parameter 2 included in the mousedown event and a parameter 3 included in the mouseup event to the mobile phone.

A first operation parameter in this embodiment of this application may include the parameter 2 and the parameter 3.

S307: The mobile phone receives the parameter 2 and the parameter 3, simulates the mousedown event and the mouseup event based on the parameter 2 and the parameter 3, and displays an interface of the application on the display of the PC based on the mousedown event and the mouseup event.

The interface of the application may be a second interface in embodiments of this application.

With reference to FIG. 6 and the description of S305, for example, the user wants to open the application (for example, the calculator), and the operation of opening the application is the click operation on the icon of the application displayed on the desktop of the mobile phone. That is, the first operation is the click operation. When the user moves, by moving the mouse of the PC, the cursor on the mobile phone to the location of the icon of the calculator, the user may perform the press operation on the mouse (for example, a left mouse button), and then lift fingers. The keyboard and mouse module of the PC may receive the press event (for example, the mousedown event) and the release event (for example, the mouseup event). Because the mouse shuttle has started, the keyboard and mouse module of the PC may intercept (or shield) the mousedown event and the mouseup event by using the hook, so that the mousedown event and the mouse lift event are not sent to a Windows system of the PC. In this way, the PC does not respond the received mousedown event and mouseup event. The keyboard and mouse module of the PC may further capture, by using the hook, a parameter in the mousedown event, for example, the parameter is referred to as the parameter 2; and capture a parameter in the mouseup event, for example, the parameter is referred to as the parameter 3. The PC may further send the parameter 2 captured in the mousedown event and the parameter 3 captured in the mouseup event to the mobile phone through the established connection.

In an example, the parameter 2 may include an operation parameter 2, and the parameter 3 may include an operation parameter 3. The operation parameter 2 may include a mouse button flag bit used to indicate that the user presses the mouse, coordinate information (where a value is empty), scroll wheel information (where a value is empty), and button location information used to indicate that the user performs an operation on the left mouse button. The operation parameter 3 may include a mouse button flag bit used to indicate that the user releases the mouse, coordinate information (where a value is empty), scroll wheel information (where a value is empty), and button location information used to indicate that the user performs an operation on the left mouse button.

The mobile phone may receive the parameter 2 and the parameter 3. Then, the mobile phone may convert, based on a preset napping relationship, a button bit code of the operation parameter 2 in the received parameter 2 into button bit code that can be identified by the mobile phone. After converting a button bit code of the operation parameter 3 in the received parameter 3 into a button bit code that can be recognized by the mobile phone, the mobile phone simulates a press event, for example, the mousedown event, by using the created virtual input device based on the operation parameter 2 after the button bit code is converted, and simulates a release event, for example, the mouseup event, by using the created virtual input device based on the operation parameter 3 after the button bit code is converted. The mobile phone may determine, based on the mousedown event, the mouseup event, and a current display location of the cursor, that the user performs the click operation on the icon of the calculator on the desktop. For example, after a keyboard and mouse shuttle starts (for example, the mobile phone receives, from the PC, shuttle state information that is used to indicate that the mouse starts to shuttle), the mobile phone may register a listener for a coordinate location of the cursor. The mobile phone may monitor the coordinate location of the cursor on the display of the mobile phone in real time by using the listener. That is, the mobile phone may determine the current coordinate location of the cursor by using the listener.

After the mobile phone determines that the user performs the tap operation on the icon of the calculator, the mobile phone may determine that the display interface of the mobile phone changes. Then, the mobile phone may first determine whether an intent of inputting the operation by the user is to display a corresponding interface, for example, the interface of the application, on the mobile phone, or to display the interface of the application on the PC. If the mobile phone determines that the operation intent of the user is to display the interface of the application on the PC, the interface of the application may be displayed on the display of the PC. If the mobile phone determines that the operation intent of the user is to display the interface of the application on the mobile phone, the interface of the application is displayed on the mobile phone, and the interface of the application is not projected onto the display of the PC.

For example, the mobile phone may determine the operation intent of the user based on an input device that inputs the click operation. If the input device (or an input source) that inputs the click operation is the mouse of the PC, it may be determined that the operation intent of the user is to display the corresponding interface on the PC. If the input device that inputs the tap operation is a touchscreen of the mobile phone, it may be determined that the operation intent of the user is to display the corresponding interface on the mobile phone. For example, the mobile phone may determine, based on the mousedown event and the mouseup event in S307, whether the input source that inputs the click operation is the mouse of the PC or the touchscreen of the mobile phone.

The mobile phone may determine, in the following manner, the input source that inputs the click operation.

Manner 1: The mobile phone may determine, based on an input device identifier (identify, ID) included in the input event, the input source that inputs the corresponding operation.

Generally, in addition to an operation parameter used to trigger a terminal to perform a corresponding operation, an input event may further include an input device ID, where the input device ID is used to identify an input source that inputs the corresponding operation. The input event obtained by the mobile phone through simulation by using the created virtual input device is no exception, and also includes an input device ID. Therefore, the mobile phone may determine, based on the input device ID included in the input event, the input source that inputs the corresponding operation.

For example, the mousedown event and the mouseup event in S307 each may include an input device ID. Because the mousedown event and the mouseup event are obtained by the mobile phone through simulation by using the created virtual input device, the input device ID is an ID of the virtual input device. The ID of the virtual input device may be generated when the mobile phone creates the virtual input device and stored in the mobile phone. On basis of this, after the mobile phone obtains the mousedown event and the mouseup event through simulation, the mobile phone may obtain the input device ID in the mousedown event and the mouseup event. The mobile phone may determine that the input device ID is the ID of the virtual input device. The virtual input device is used by the mobile phone to simulate a corresponding input event after the user inputs an operation by using the input device of the PC. Therefore, when the mobile phone determines that the input device ID included in the input event is the ID of the virtual input device, the mobile phone may determine the input device that inputs the corresponding input operation, namely, the click operation, is the mouse of the PC.

Manner 2: The mobile phone may determine, based on an input mode included in the input event, the input source that inputs the corresponding operation.

An input event may further include an input mode, where the input mode is used to indicate a type of a device that inputs a corresponding operation, for example, a mouse, a touchscreen, or a touchpad. The input event obtained by the mobile phone through simulation by using the created virtual input device is no exception, and also includes an input mode. Therefore, the mobile phone may determine, based on the input mode included in the input event, the input source that inputs the corresponding operation.

For example, the mousedown event and the mouseup event in S307 each may include an input mode. The mousedown event and the mouseup event are mouse events obtained by the mobile phone through simulation. Therefore, the input mode is used to indicate that a device that inputs the corresponding operation is the mouse. On basis of this, after the mobile phone obtains the mousedown event and the mouseup event through simulation, the mobile phone may obtain the input mode in the mousedown event and the mouseup event. Based on the input mode, the mobile phone may determine the input source that inputs the corresponding operation, namely, the click operation, is the mouse.

When the mobile phone determines that the input source that inputs the corresponding operation is the mouse, it may be understood that the mouse may be directly connected to the mobile phone, or may be another device, for example, the mouse shared by the PC with the mobile phone. Therefore, further, the mobile phone may further determine whether the mouse is currently in a mouse shuttle state, that is, determine whether the mouse is the mouse shared by the PC with the mobile phone. When the mobile phone determines that the mouse is currently in the mouse shuttle state, it indicates that the user inputs the click operation by using the mouse of the PC. In this case, the mobile phone may determine the input source that inputs the corresponding operation, namely, the click operation, is the mouse of the PC.

Figure 7:
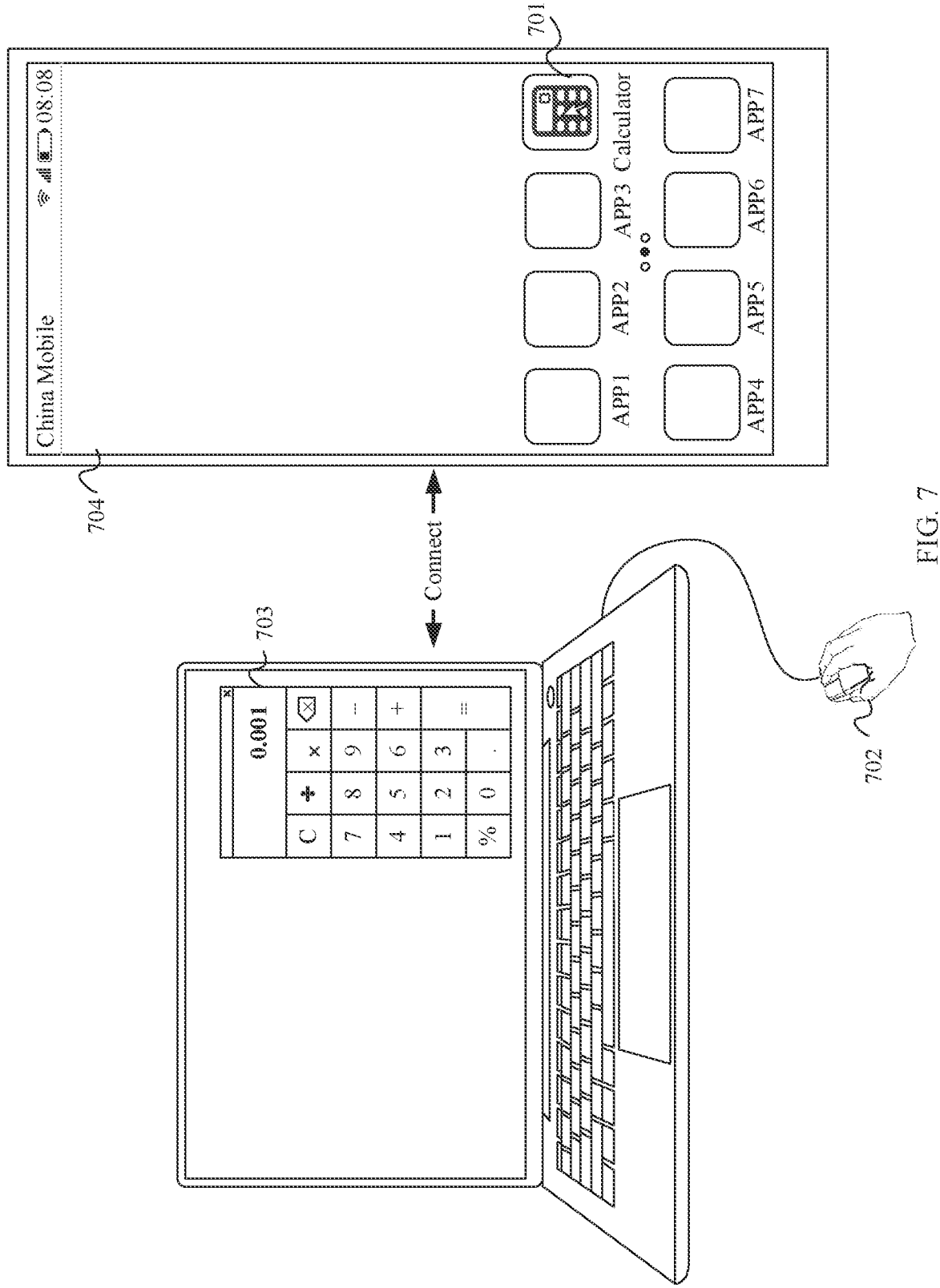
FIG. 7 is a schematic diagram of still another display interface according to an embodiment of this application.

In Manner 1 or Manner 2, the mobile phone may determine the input source that inputs the foregoing click operation is the mouse of the PC, and it indicates that the operation intent of the user is to display the corresponding interface on the PC. In response to the mousedown event and the mouseup event, the mobile phone may display the corresponding interface, namely, the application interface of the icon clicked by the user, on the display of the PC. For example, with reference to the example in FIG. 6, as shown in FIG. 7, after the cursor on the mobile phone moves to the icon 701 of the calculator, the user performs the click operation on the icon 701 of the calculator by using a mouse 702 of the PC, for example, press a left button of the mouse 702 of the PC and lift the finger. In this case, as a response, the mobile phone may display an interface of the calculator on the display of the PC. As shown in FIG. 7, the PC displays an interface 703 of the calculator. For the mobile phone, after the user performs the click operation on the icon 701 of the calculator by using the mouse of the PC, the interface displayed by the mobile phone may not be changed. As shown in FIG. 7, a desktop 704 is still displayed. The mobile phone may alternatively display the interface 703 of the calculator, which is not shown in the figure.

With reference to FIG. 2B, in an example, a specific implementation in which the mobile phone displays the interface of the calculator on the display of the PC may be as follows: After determining that the user enters the click operation by using the mouse, the mobile phone may start a projection service. Then, the mobile phone, for example, a projection service module in the mobile phone, may obtain data corresponding to the interface of the calculator, and send the data to the PC. After receiving the data, the PC may display the interface of the calculator on the display of the PC based on the data. For example, the projection service module in the mobile phone may obtain the data corresponding to the interface of the calculator by using a display manager (for example, the display manager is a module at a framework layer of the mobile phone) of the mobile phone, for example, screen recording data, and send the data to the PC, so that the interface of the calculator can be displayed on the display of the PC.

In some embodiments, a distributed multimedia protocol (Distributed Multi media Protocol, DMP) may be used to display an interface in the mobile phone on the display of the PC. For example, after the mobile phone determines that the user enters an operation by using the input device of the PC, the projection service module of the mobile phone may create a virtual display (VirtualDisplay) by using a display manager (DisplayManager) of the mobile phone. For example, the projection service module of the mobile phone sends, to the display manager of the mobile phone, a request for creating the VirtualDisplay. After creating the VirtualDisplay, the display manager of the mobile phone may return the created VirtualDisplay to the projection service module of the mobile phone. Then, the projection service module of the mobile phone may move an interface that needs to be drawn in response to the operation, for example, an interface of the calculator, to the VirtualDisplay for drawing. In this way, the projection service module of the mobile phone may obtain corresponding screen recording data. After obtaining the screen recording data, the projection service module of the mobile phone may encode the screen recording data, and then send encoded screen recording data to the PC. A projection service module of the PC may receive the corresponding data, and may obtain the screen recording data after decoding the data. Then, the projection service module of the PC cooperates with a framework layer of the PC to draw a corresponding interface, for example, the interface of the calculator, based on the screen recording data, and display the interface on the display of the PC. For example, the framework layer of the PC may provide a surface view to implement display of the interface of the mobile phone at the PC end.

In some other embodiments, an interface of the mobile phone may be displayed on the display of the PC through Miracast (Miracast). To be specific, the mobile phone may obtain all layers of the interface that needs to be drawn in response to the operation, then integrate all the obtained layers into a video stream (or referred to as screen recording data), encode the video stream, and send the video stream to the PC by using the real time streaming protocol (real time streaming protocol, RTSP). After receiving the video stream, the PC may decode and play the video stream, to display the interface of the mobile phone on the display of the PC. Alternatively, the mobile phone may extract an instruction from an interface that needs to be drawn in response to the operation, for example, the interface of the calculator to obtain an instruction stream, obtain layer information of the interface, and then send the instruction stream, the layer information, and the like to the PC for the PC to restore the interface that needs to be drawn in response to the operation, thereby implementing display of the interface of the mobile phone on the PC.

For example, the user controls the mobile phone by using the input device of the mobile phone. The method may include S308 and S309.

S308: The mobile phone receives a tap operation that is of the user for the icon of the application displayed by the mobile phone and that is on the touchscreen of the mobile phone.

S309: The mobile phone displays the interface of the application on the mobile phone based on the tap operation.

When the user wants to control the mobile phone by using the input device of the mobile phone, for example, the touchscreen, the user may perform a touch control operation at a corresponding location on the touchscreen by using a finger. For example, the user wants to open an application (for example, a calculator). For example, the first interface is the desktop, content that the user wants to operate is the icon of the application on the desktop, and an operation of opening the application is the tap operation for the icon of the application displayed on the desktop of the mobile phone, that is, the first operation is the tap operation. The user may perform, by using the finger, the tap operation on the icon of the calculator displayed on the desktop of the mobile phone. Then, the mobile phone may receive a corresponding input event (where the input event may be a second input event in this embodiment of this application). The mobile phone may determine, based on the input event and the operation location of the user, that the user performs the tap operation on the icon of the calculator on the desktop.

As described in S306 and S307, when the mobile phone determines that the user performs the tap operation on the icon of the calculator, the mobile phone may determine that the display interface of the mobile phone changes. Then, the mobile phone may first determine whether an intent of inputting the operation by the user is to display a corresponding interface, for example, the interface of the application, on the mobile phone, or to display the interface of the application on the PC. The mobile phone may determine the operation intent of the user based on the input device (or an input source) that inputs the tap operation. The input source that inputs the tap operation may be implemented in Manner 1 or Manner 2 in S307.

For example, after the user performs the tap operation at the location of the icon of the calculator on the touchscreen of the mobile phone, the mobile phone may receive the corresponding input event, where the input event includes an input device ID, and the input device ID is used to indicate that the input source that inputs the tap operation is the touchscreen of the mobile phone. Therefore, the mobile phone may determine, based on the input device ID in the input event, that the input source that inputs the tap operation is the touchscreen of the mobile phone. For another example, after the user performs the tap operation at the location of the icon of the calculator on the touchscreen of the mobile phone, the mobile phone nay receive the corresponding input event, where the input event includes an input mode, and the input mode is used to indicate that the input source that inputs the tap operation is the touchscreen of the mobile phone. Therefore, the mobile phone may determine, based on the input mode in the input event, that the input source that inputs the tap operation is the touchscreen of the mobile phone.

Figure 8A:
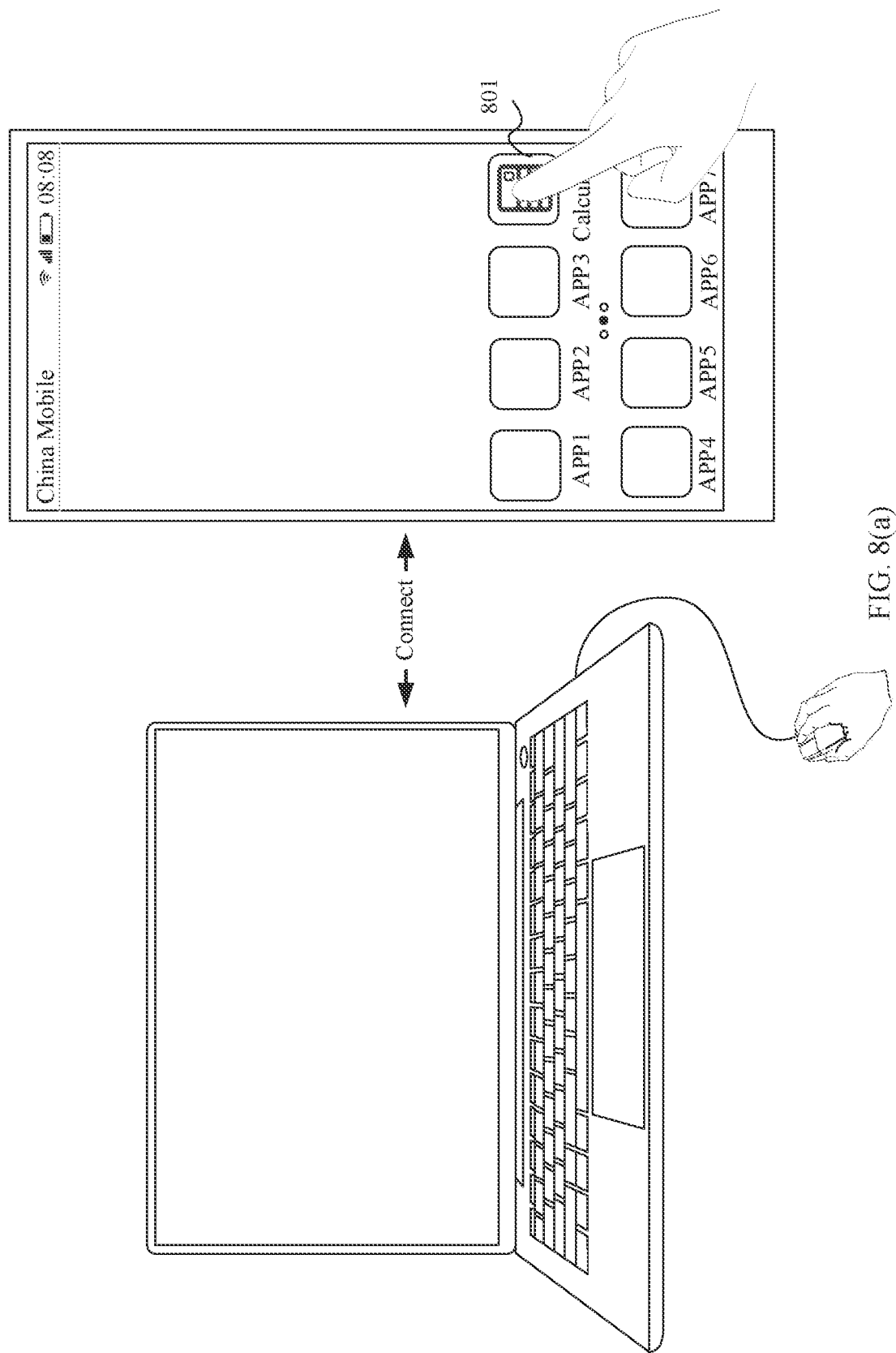
FIG. 8(a) and FIG. 8(b) are a schematic diagram of still another display interface according to an embodiment of this application.
Figure 8B:
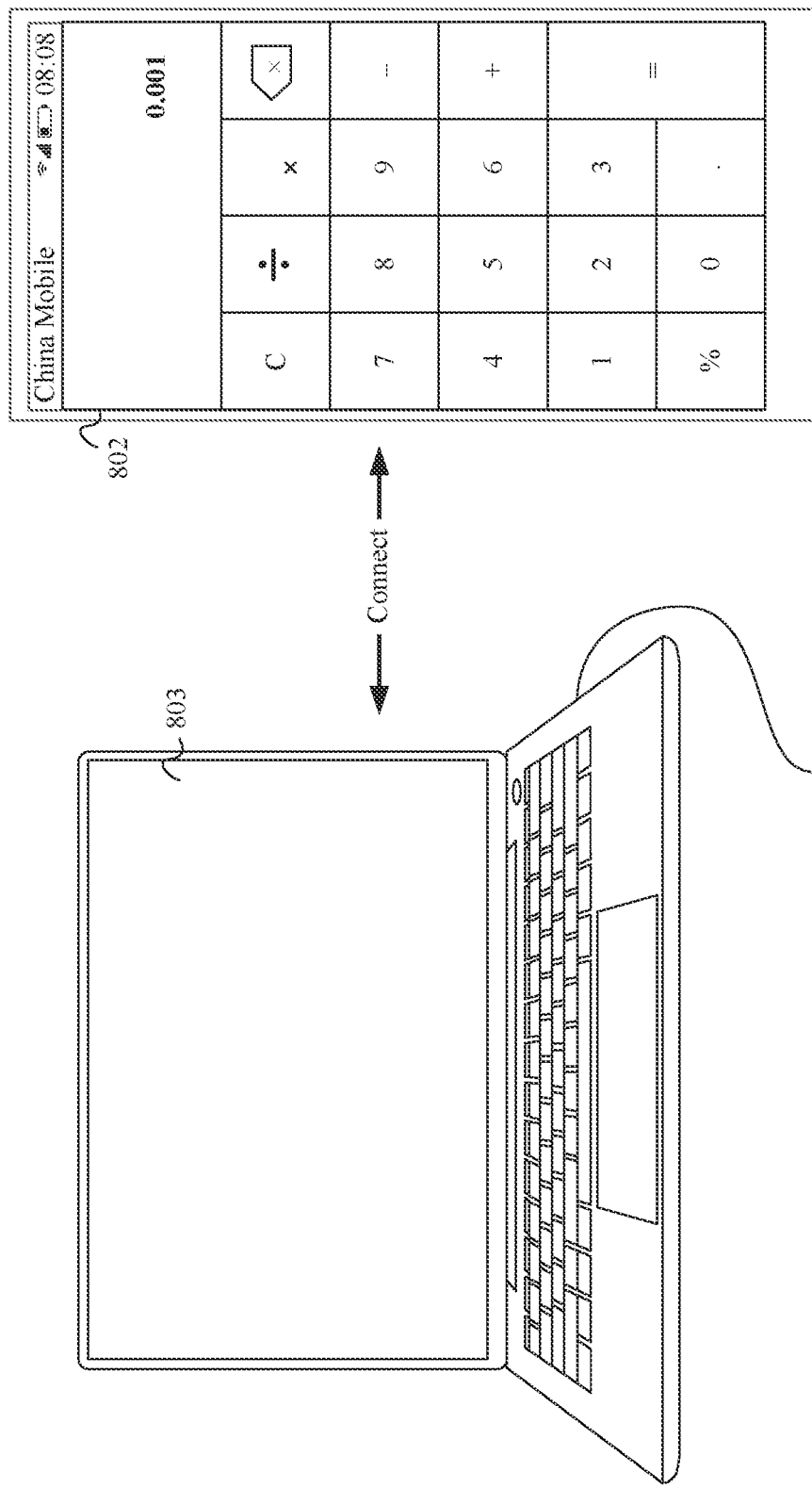

In Manner 1 or Manner 2, the mobile phone may determine that the input source that inputs the foregoing tap operation is the touchscreen of the mobile phone, and it indicates that the user wants to display the interface of the calculator on the mobile phone. In this case, in response to the input event, the mobile phone may display the interface of the calculator on the mobile phone, but does not display the interface of the calculator on the display of the PC. For example, as shown in FIG. 8(*a*), when the mobile phone establishes the connection to the PC, and the mobile phone creates the virtual input device, the user performs, by using fingers, the touch control operation such as a tap operation on the icon 801 of the calculator displayed on the desktop of the mobile phone. As shown in FIG. 8(*b*), as a response, the mobile phone may display an interface 802 of the calculator on the mobile phone, but does not project the interface 802 of the calculator onto a display 803 of the PC for display.

In the foregoing example, the user performs, by using the input device of the PC or the input device of the mobile phone, the operation on the icon of the application displayed on the mobile phone. In some other embodiments, the user may also perform an operation on other content (for example, content on the first interface in embodiments of this application) displayed on the mobile phone by using the input device of the PC or the input device of the mobile phone. After the user performs the operation on the content displayed on the mobile phone, if the display interface of the mobile phone changes, the mobile phone may determine, based on an input device ID or an input mode included in an input event corresponding to the operation, whether an input source that inputs the operation is the touchscreen of the mobile phone or the mouse of a PC. Therefore, whether an operation intent of the user is to display a corresponding interface (for example, the second interface in embodiments of this application) on the PC or display a corresponding interface (for example, the second interface in embodiments of this application) on the mobile phone is determined. If the input source that inputs the operation is the mouse of the PC, the mobile phone may display the corresponding interface on the display of the PC. If the input source that inputs the operation is the touchscreen of the mobile phone, the mobile phone may display the corresponding interface on the mobile phone, but does not project the interface onto the display of the PC.

Figure 9A:
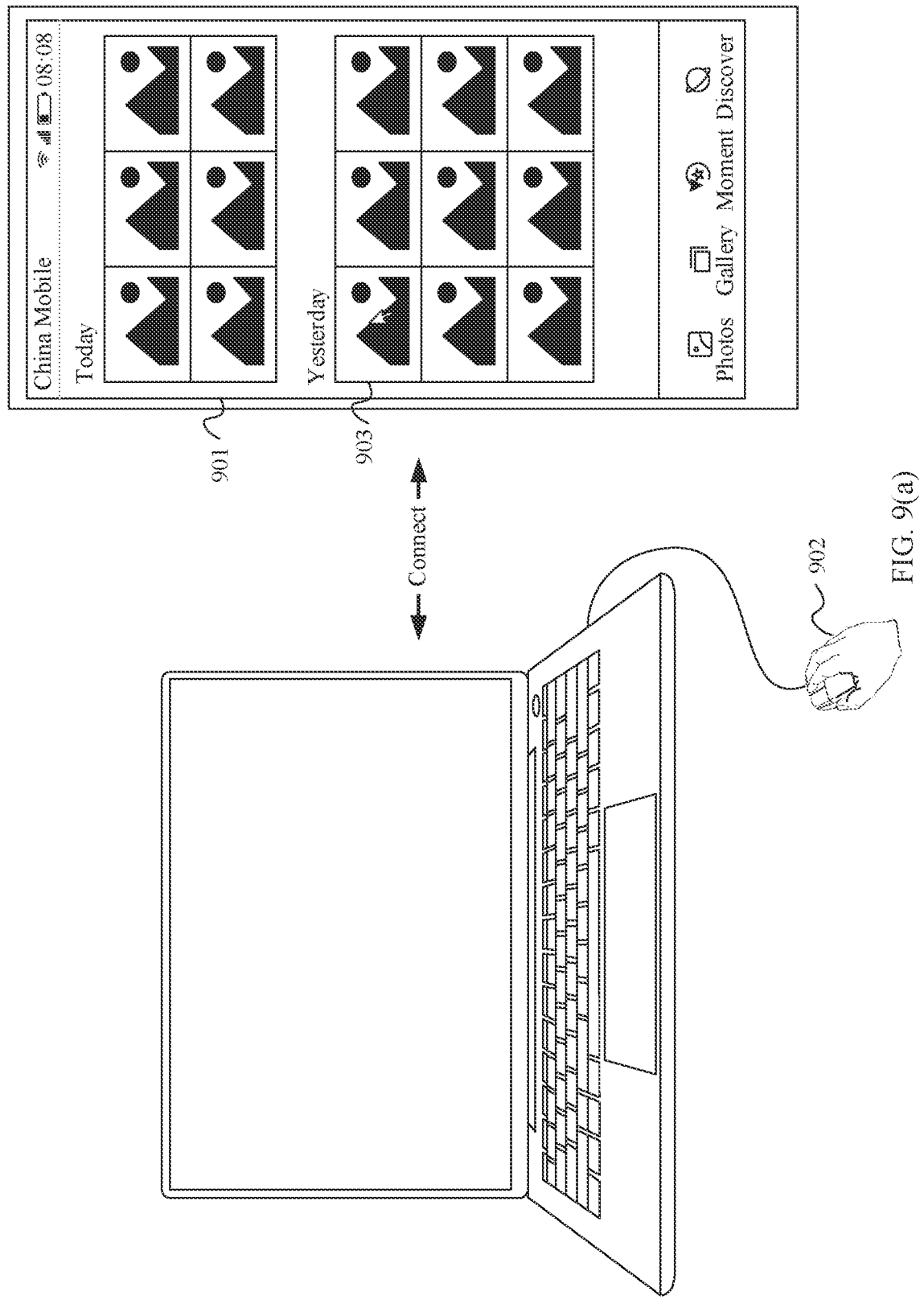
FIG. 9(a) and FIG. 9(b) are a schematic diagram of still another display interface according to an embodiment of this application.
Figure 9B:
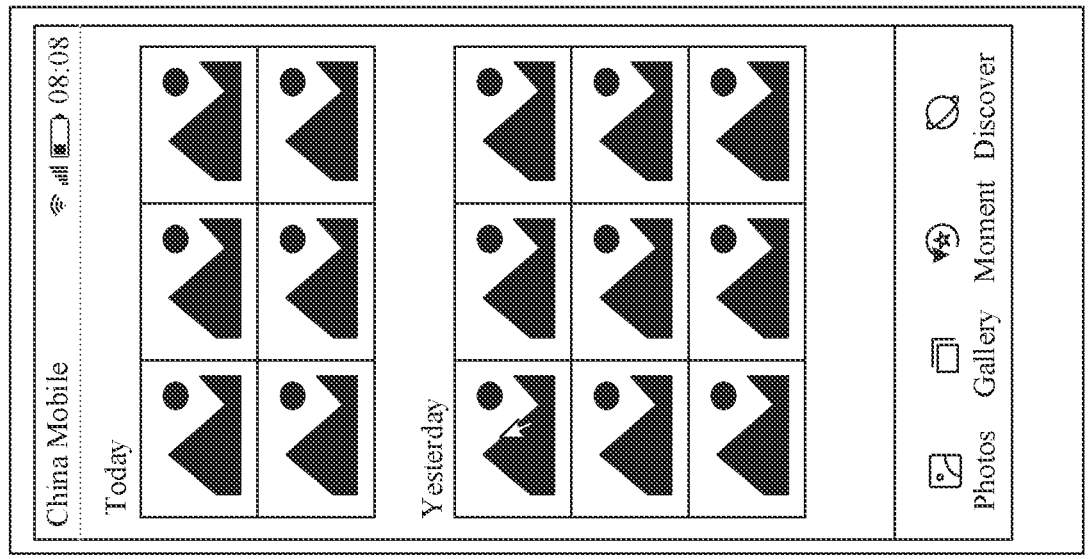
Figure 9B:
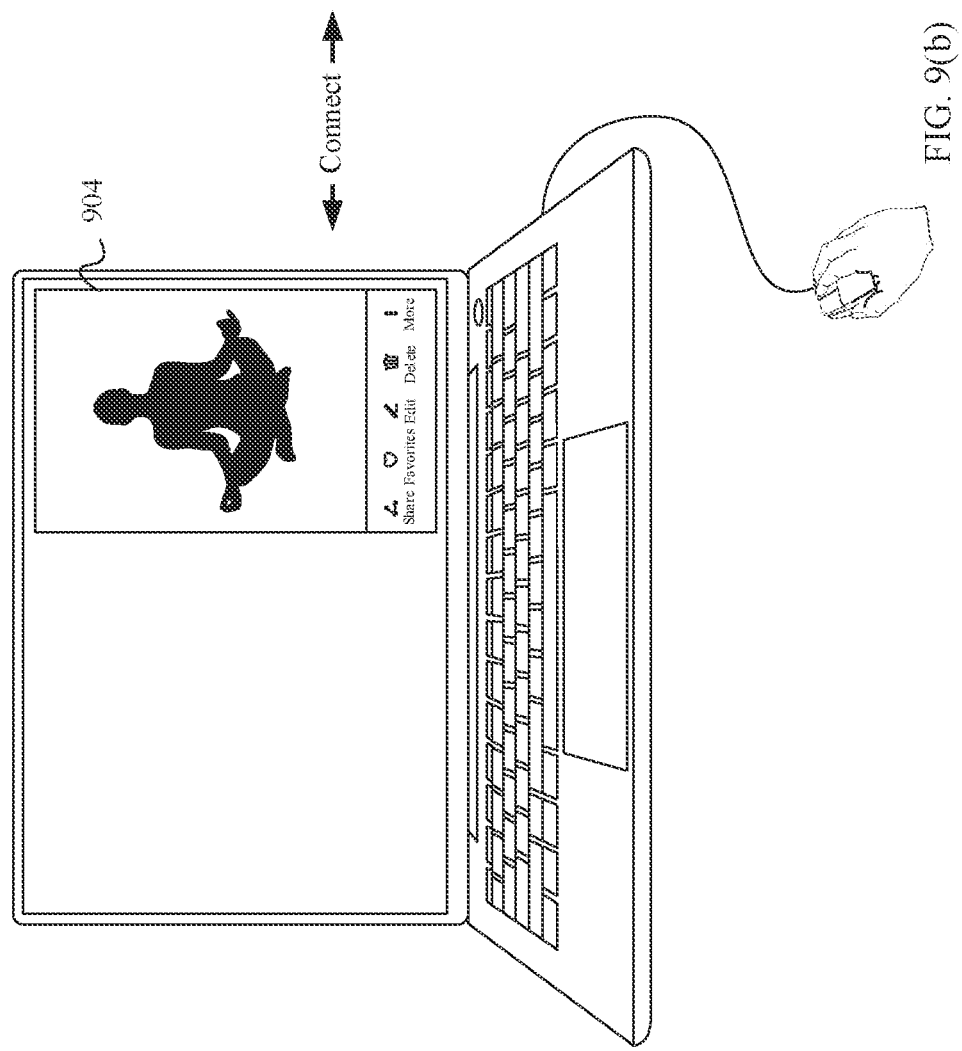
Figure 10A:
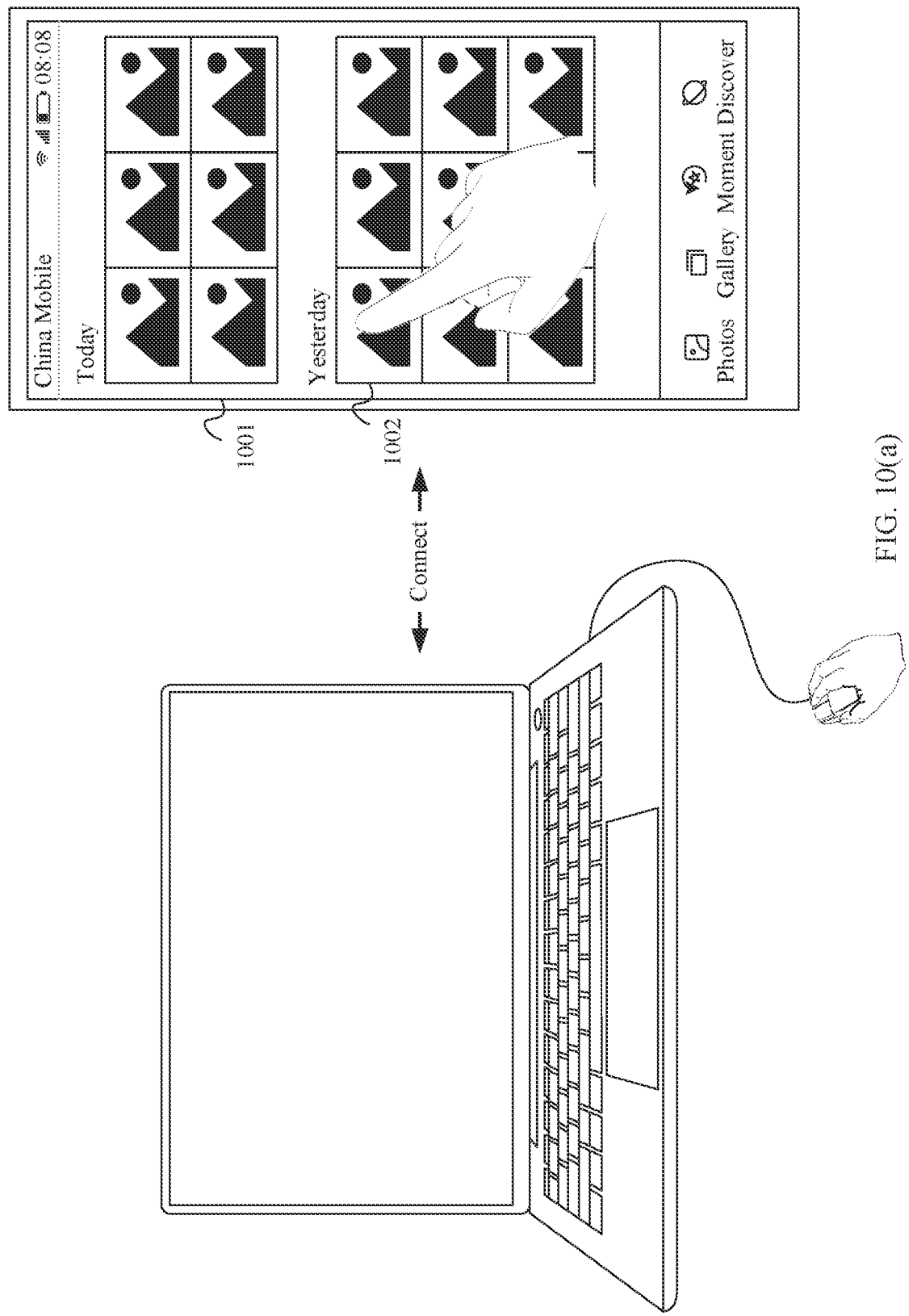
FIG. 10(a) and FIG. 10(b) are a schematic diagram of still another display interface according to an embodiment of this application.
Figure 10B:
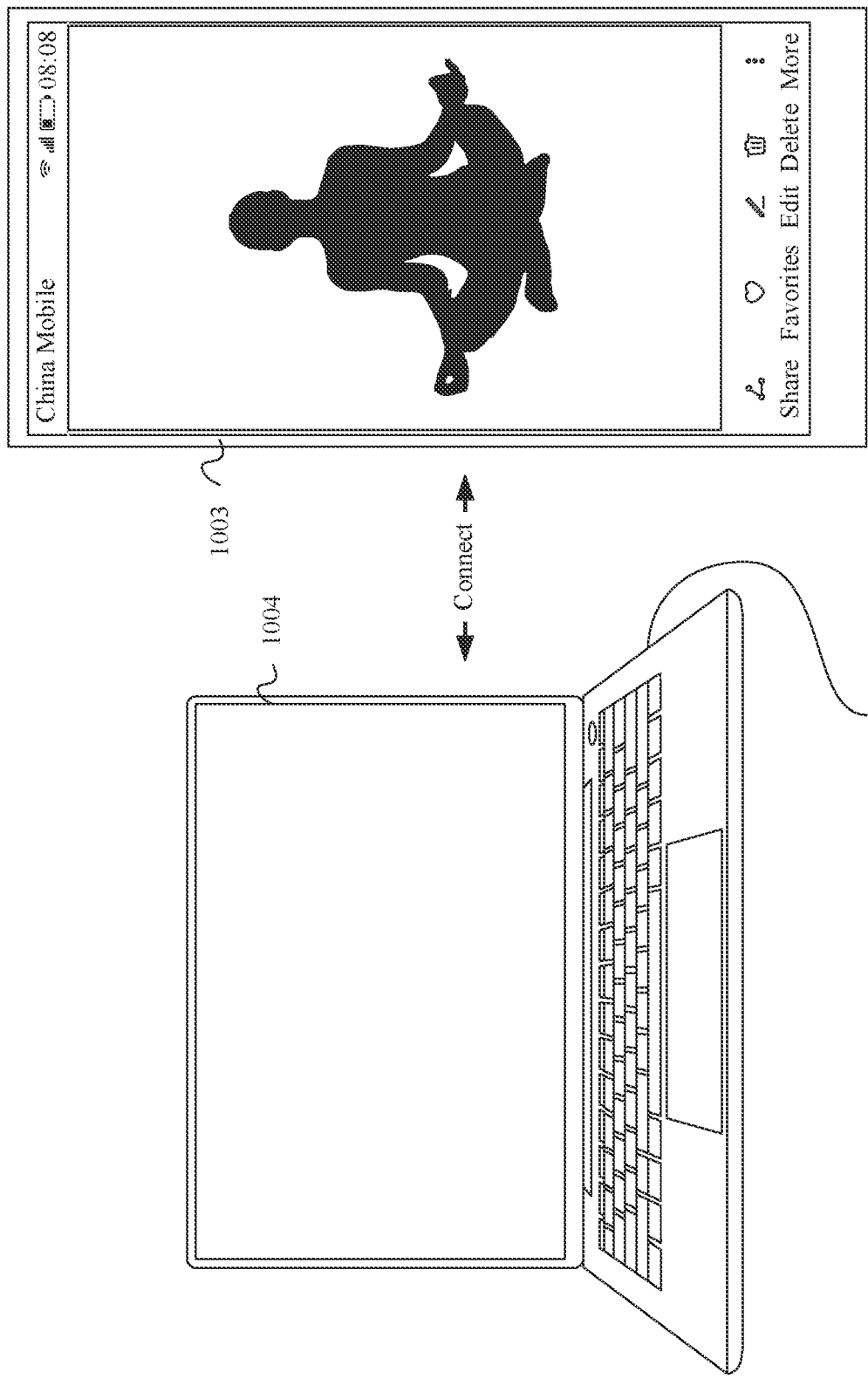

For example, as shown in FIG. 9(*a*), the mobile phone currently displays a home page 901 of Gallery. The home page 901 of Gallery includes thumbnails of a plurality of pictures including a thumbnail 903 of a picture 1. When the user wants to display the picture 1 on the PC, the user may move a mouse 902 of the PC, so that the mouse of the PC shuttles to the mobile phone. Then, the user may continue to move the mouse of the PC, so that the cursor on the mobile phone moves to a location of the thumbnail 903 of the picture 1. The user may perform a click operation by using the mouse 902 of the PC. The mobile phone may obtain an input event corresponding to the click operation. The mobile phone may determine, based on an input device ID or an input mode included in the input event, that the input source that inputs the click operation is the mouse of the PC. In this way, as a response to the click operation, the mobile phone may display, on the display of the PC, a detail interface including the picture 1. As shown in FIG. 9(*b*), the detail interface of the picture 1 displayed on the PC is shown in 904. For another example, as shown in FIG. 10(*a*), the mobile phone currently displays a home page 1001 of Gallery. The home page 1001 of Gallery includes thumbnails of a plurality of pictures including a thumbnail 1002 of a picture 1. When the user wants to display the picture 1 on the mobile phone, the user may perform a tap operation at a location of the thumbnail 1002 of the picture 1 on the touchscreen of the mobile phone. Then, the mobile phone may obtain a corresponding input event, and the mobile phone may determine, based on an input device ID or an input mode included in the input event, that an input source that inputs the tap operation is the touchscreen of the mobile phone. Therefore, as shown in FIG. 10(*b*), as a response to the tap operation, the mobile phone may display a detail interface 1003 of the picture 1 on the mobile phone, but does not project the detail interface 1003 onto the display 1004 of the PC for display. A specific implementation is similar to an implementation in which the user performs, by using the input device of the PC or the input device of the mobile phone, the operation on the icon of the application displayed on the mobile phone. Details are not described herein again.

In addition, it should be noted that, in the foregoing example, an example in which the interface of the mobile phone is not projected onto the PC for display before the user performs the touch operation on the touchscreen of the mobile phone is used for description. In some other embodiments, if the mobile phone has projected an interface of the mobile phone onto the display of the PC before the user performs the touch operation on the touchscreen of the mobile phone, after the mobile phone receives the touch operation of the user on the touchscreen of the mobile phone, the mobile phone may not only display the corresponding interface on the mobile phone, but also stop projection and display of the interface of the mobile phone on the display of the PC.

In some embodiments, after S302 to S307, if the user wants to control the PC by using the input device such as the mouse of the PC, the user may move the mouse, so that the cursor displayed on the mobile phone slides out of an edge of the display of the mobile phone. After the cursor on the mobile phone slides out of the edge of the display of the mobile phone, the keyboard and mouse shuttle ends. After the keyboard and mouse shuttle ends, the user may control the PC by using the mouse of the PC.

For example, when the mobile phone determines that the cursor on the mobile phone slides out of the edge of the display of the mobile phone, it indicates that the user wants to control another device by using the mouse. As described in S304, if the mobile phone establishes the connection to only one device of the PC, it indicates that the user wants to control the PC by using the mouse. If the mobile phone establishes connections to a plurality of devices, the mobile phone may display a list option, where the list option includes identifiers of all the devices connected to the mobile phone, for the user to select a device that the user wants to control by using the mouse. If the user selects an identifier of the PC, it indicates that the user wants to control the PC by using the mouse. Alternatively, a shuttle relationship may be pre configured on the mobile phone, and is used to determine a device to which the mouse shuttles, that is, determine which device responds to the operation of the mouse. Specific descriptions of configuration and application of the shuttle relationship are similar to descriptions of corresponding content in the foregoing embodiment. Details are not described herein again. After the mobile phone determines that the user wants to control the PC by using the mouse, the mobile phone may send, to the PC, shuttle state information used to indicate that the keyboard and mouse shuttle ends. After receiving the shuttle state information, the PC may determine that the mouse shuttle ends. Then, the PC may uninstall the hook (or close the hook), that is, cancel interception of an input event, for example, a mouse event. Then, when the user performs an operation by using the input device of the PC, the keyboard and mouse module of the PC does not intercept a received input event, but sends the received input event to the Windows system of the PC, so that the Windows system of the PC responds to the input event, that is, the user can control the PC by using the mouse of the PC. The keyboard and mouse module of the PC may also enable the cursor to redisplay on the display of the PC.

In an example, a specific implementation in which the mobile phone determines that the cursor on the mobile phone slides out of the edge of the display of the mobile phone may be as follows: After the cursor is displayed on the mobile phone, the mobile phone may monitor the real time coordinate location of the cursor on the display of the mobile phone (for example, the real time coordinate location of the cursor may be obtained by using the registered listener). The mobile phone may determine the coordinate location of the cursor on the display of the mobile phone based on an initial location and relative displacement of the cursor, so as to determine whether the cursor slides out of the edge of the display of the mobile phone. The initial location of the cursor may be a coordinate location of the cursor on the display of the mobile phone when the mouse starts to move, or in other words, a coordinate location of the cursor on the display of the mobile phone before the mouse starts to move. The initial location of the cursor may specifically indicate a coordinate location in a coordinate system in which the upper left corner of the display of the mobile phone is a coordinate origin, an X axis points from the upper left corner to the right edge of the display of the mobile phone, and a Y axis points from the upper left corner to the lower edge of the display of the mobile phone. A specific implementation in which the mobile phone determines that the cursor slides out of the edge of the display of the mobile phone is similar to a specific implementation in which the PC determines that the cursor slides out of the edge of the display of the PC. Details are not described herein again.

The foregoing method is used in the scenario in which the mobile phone and the PC are collaboratively used. When the user controls the mobile phone by using the input device of the PC, the mobile phone may project the corresponding interface onto the PC for display. When the user controls the mobile phone by using the input device of the mobile phone, the corresponding interface is displayed on the mobile phone, and the corresponding interface is not projected onto the PC for display. In this way, the user can freely control, according to an actual requirement of the user, the interface of the second terminal to display on different devices. This not only protects user privacy, but also avoids the user from diverting attention, to improve user experience.

In the foregoing embodiment, an example in which after the user performs the operation on the display content of the mobile phone by using the input device of the PC or the input device of the mobile phone, the mobile phone chooses, based on different input device IDs or input mode included in a corresponding input event, to display the corresponding interface on different devices is used for description. It may be understood that, in the keyboard and mouse sharing mode, the PC may not only share the mouse of the PC with the another terminal, for example, the mobile phone, but also share a keyboard of the PC with the mobile phone. However, in a related technology, in the keyboard and mouse sharing mode, regardless of whether the user performs an operation in an input box displayed on the mobile phone by using the input device of the mobile phone or performs an operation in an input box displayed on the mobile phone by using the mouse of the PC, the mobile phone does not display a virtual keyboard on the mobile phone, but uses the keyboard, for example, a physical keyboard, of the PC by default to implement input. However, when the user performs the operation in the input box by using the input device of the mobile phone, for example, the touchscreen, a focus should be on the mobile phone. In this case, if the physical keyboard of the PC is still used to implement input, attention needs to be frequently switched between the two devices. This reduces efficiency of collaboratively using the plurality of terminals.

Figure 11A:
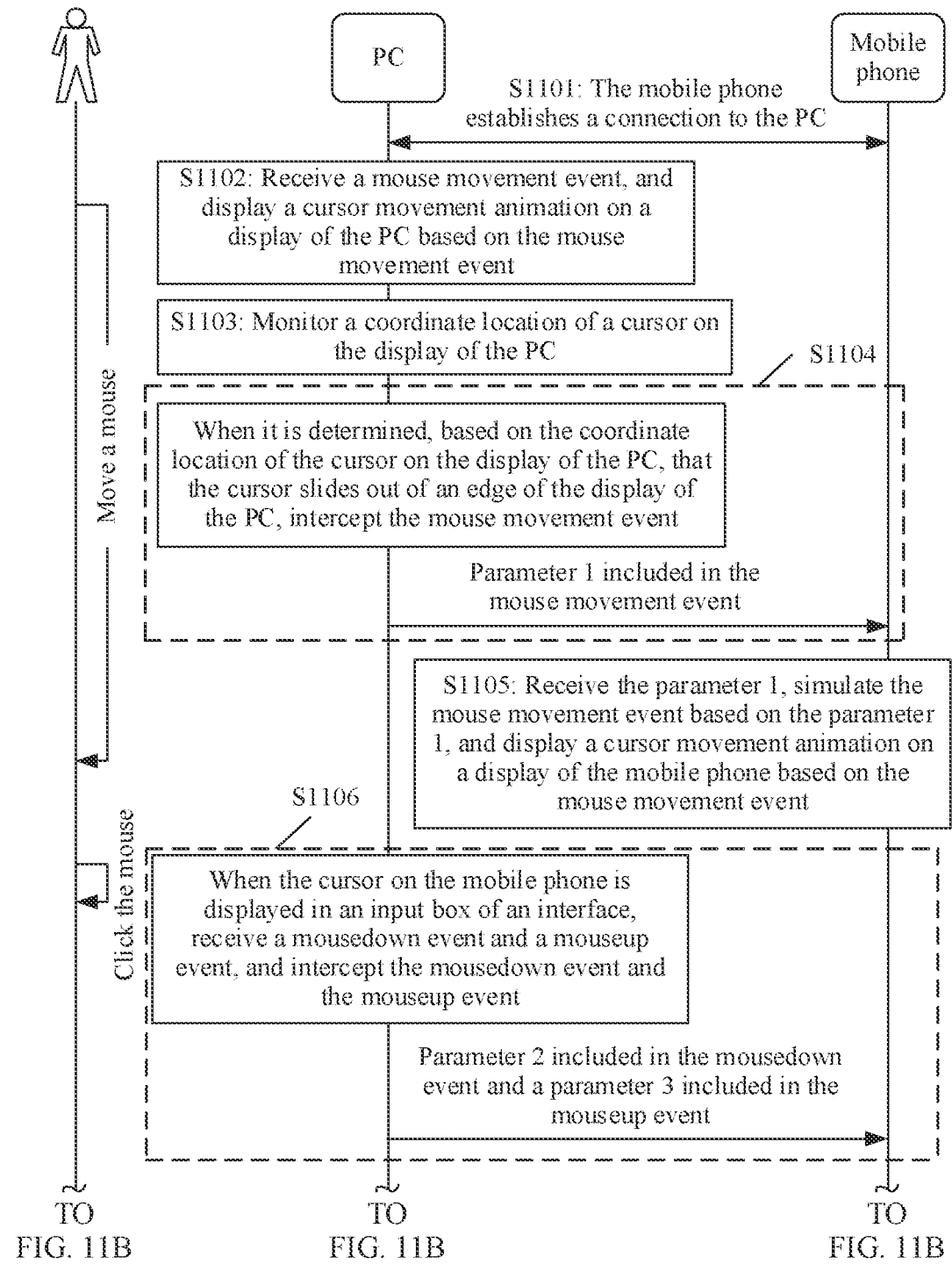
FIG. 11A and FIG. 11B are a schematic flowchart of another display method according to an embodiment of this application.
Figure 11B:
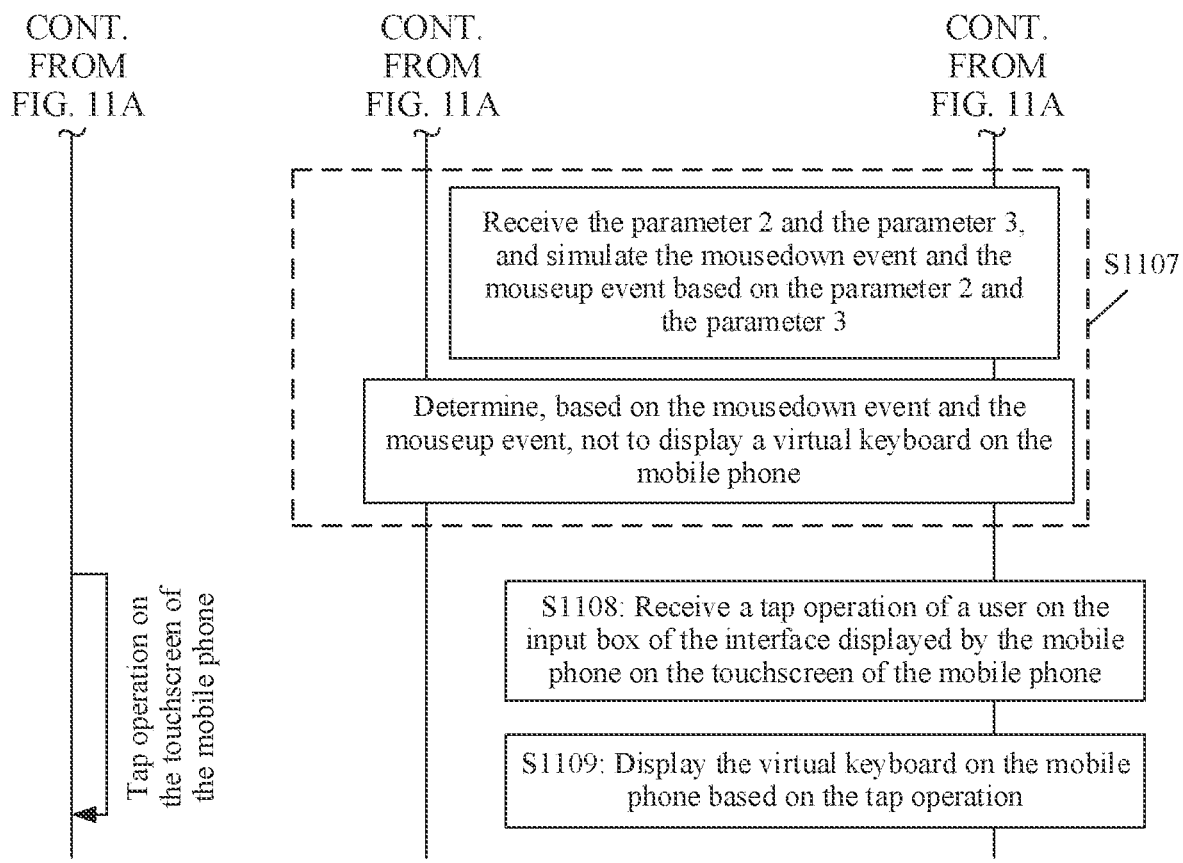

To resolve this problem, refer to FIG. 11A and FIG. 11B. This embodiment further provides a display method. FIG. 11A and FIG. 11B are a schematic flowchart of another display method according to an embodiment of this application. As shown in FIG. 11A and FIG. 11B, the method may include S1101 to S1109.

S1101: A mobile phone establishes a connection to a PC.

S1102: The PC receives a mouse movement event, and displays a cursor movement animation on a display of the PC based on the mouse movement event.

S1103: The PC monitors a coordinate location of a cursor on the display of the PC.

S1104: When determining, based on the coordinate location of the cursor on the display of the PC, that the cursor slides out of an edge of the display of the PC, the PC intercepts the mouse movement event, and sends a parameter 1 included in the mouse movement event to the mobile phone.

S1105: The mobile phone receives the parameter 1, simulates the mouse movement event based on the parameter 1, and displays a cursor movement animation on a display of the mobile phone based on the mouse movement event.

S1106: When the cursor on the mobile phone is displayed in an input box of an interface, the PC receives a mousedown event and a mouseup event, intercepts the mousedown event and the mouseup event, and sends a parameter 2 included in the mousedown event and a parameter 3 included in the mouse lift event to the mobile phone.

The interface of the application may be a third interface in embodiments of this application.

S1107: The mobile phone receives the parameter 2 and the parameter 3, simulates the mousedown event and the mouseup event based on the parameter 2 and the parameter 3, and determines, based on the mousedown event and the mouseup event, not to display a virtual keyboard on the mobile phone.

S1108: The mobile phone receives a tap operation of the user on the input box of the interface displayed by the mobile phone on the touchscreen of the mobile phone. The interface of the application may be the third interface in embodiments of this application.

S1109: The mobile phone displays the virtual keyboard on the mobile phone based on the tap operation.

With reference to the foregoing steps, it may be understood that, in this embodiment, after receiving an operation (for example, the second operation in this embodiment of this application) of the user on the input box displayed on the mobile phone, the mobile phone may determine, based on an input device ID or an input mode included in an input event (for example, the third input event or the fourth input event in this embodiment of this application) corresponding to the operation, whether an input source of the operation is an input device of the mobile phone or an input device of the PC, to determine whether to display the virtual keyboard on the mobile phone. If the input source that inputs the operation is the input device of the PC, for example, the mouse, the mobile phone may not display the virtual keyboard on the mobile phone, and the user may implement input by using the keyboard of the PC. If the input source that inputs the operation is the input device of the mobile phone, for example, the touchscreen, the mobile phone may display the virtual keyboard on the mobile phone, and the user may implement input by using the virtual keyboard. It should be noted that specific descriptions of S1101 to S1109 are similar to descriptions of corresponding steps in S301 to S309 in the foregoing embodiment. Details are not described herein again.

Figure 12A:
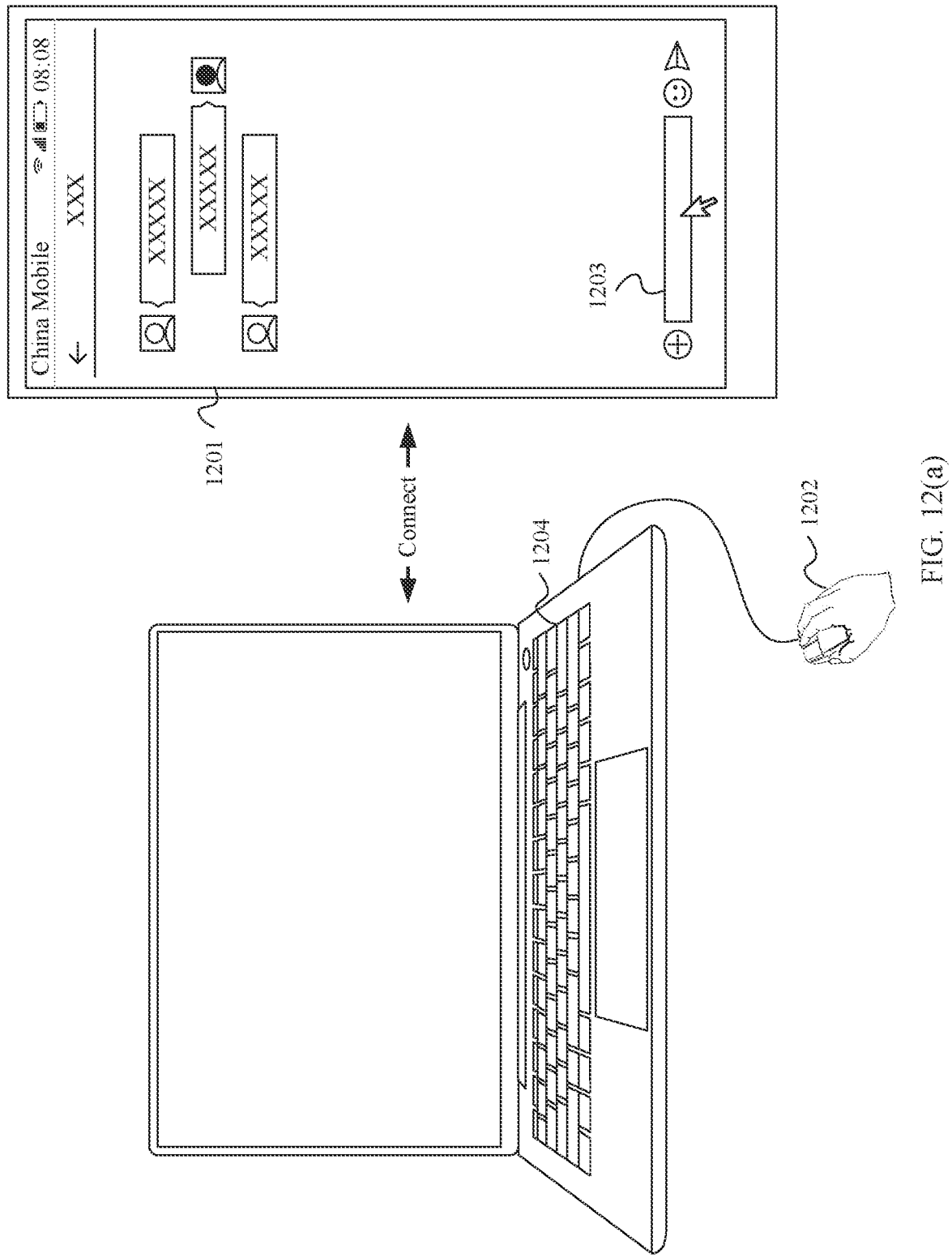
FIG. 12(a) and FIG. 12(b) are a schematic diagram of still another display interface according to an embodiment of this application.

For example, as shown in FIG. 12(a), the mobile phone currently displays a chat interface 1201. The chat interface 1201 includes an input box 1203. When the user wants to enter a character in the input box 1203 by using the keyboard of the PC, the user may move a mouse 1202 of the PC, so that the mouse of the PC shuttles to the mobile phone. Then, the user may continue to move the mouse of the PC, so that the cursor on the mobile phone moves to a location of the input box 1203. The user may perform a click operation by using the mouse 1202 of the PC. The mobile phone may obtain an input event corresponding to the click operation. The mobile phone may determine, based on an input device ID or an input mode included in the input event, that an input source that inputs the click operation is the mouse of the PC. In this way, the mobile phone may determine not to display the virtual keyboard on the mobile phone, and the user may input the character in the input box 1203 by using a keyboard 1204 of the PC. A specific implementation in which the user implements input in the input box 1203 by using the keyboard 1204 of the PC may be as follows: After the user operates the keyboard 1204 of the PC, the PC (for example, a keyboard and mouse module of the PC) may receive a corresponding input event, for example, a keyboard event, the keyboard event includes an operation parameter of a specific operation performed by the user on the keyboard 1204. The keyboard and mouse module of the PC may intercept the keyboard event (for example, perform interception by using the mounted hook). As a result, the keyboard event is not sent to the Windows system of the PC, and the PC does not respond to the keyboard event. The keyboard and mouse module of the PC may also capture the operation parameter in the keyboard event. Then, the PC may send the operation parameter to the mobile phone. After receiving the operation parameter, the mobile phone may simulate (for example, perform simulation by using a created virtual input device) the corresponding keyboard event based on the operation parameter. In response to the keyboard event, the mobile phone may display the corresponding character in the input box 1203, to implement input.

Figure 12B:
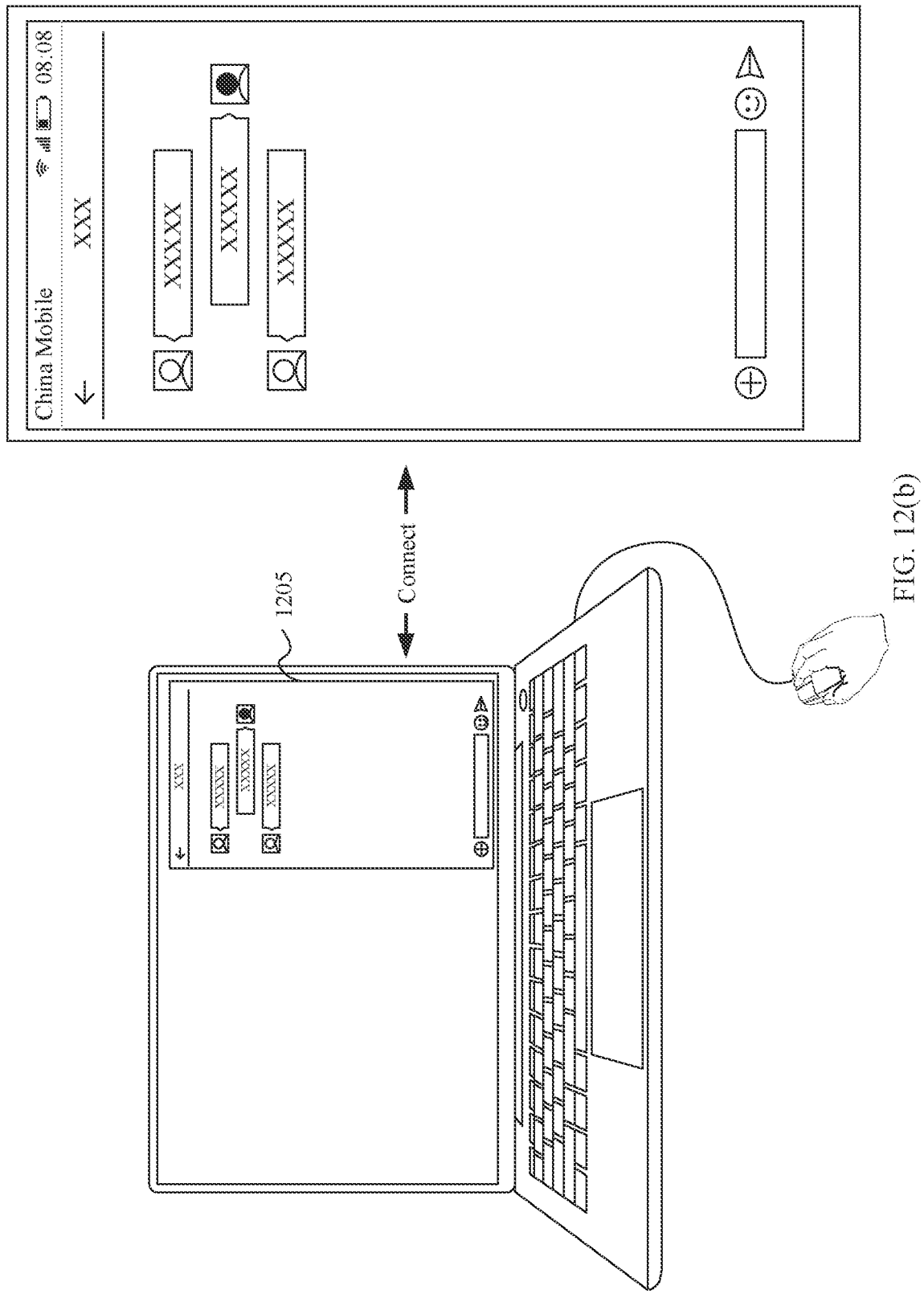

Optionally, the mobile phone may display the chat interface 1201 on the display of the PC, as shown in FIG. 12(b). The chat interface displayed on the PC is shown in 1205. When the PC displays the chat interface 1205, the user still enters the character by using the keyboard 1204 of the PC, and an input result may be synchronously displayed on the PC (for example, the PC updates the projection interface, so that the input result can be synchronously displayed on the PC).

Figure 13A:
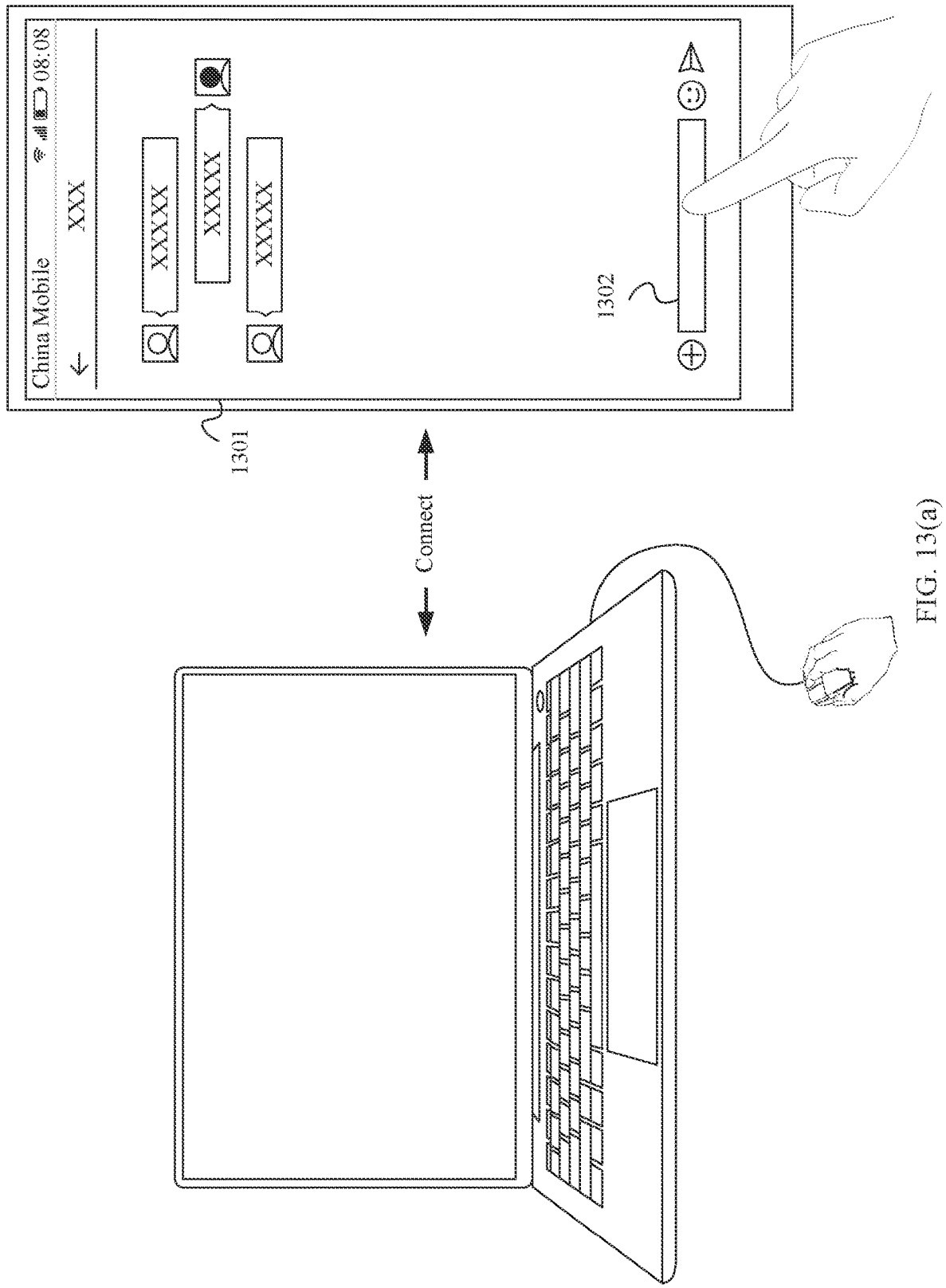
FIG. 13(a) and FIG. 13(b) are a schematic diagram of still another display interface according to an embodiment of this application.
Figure 13B:
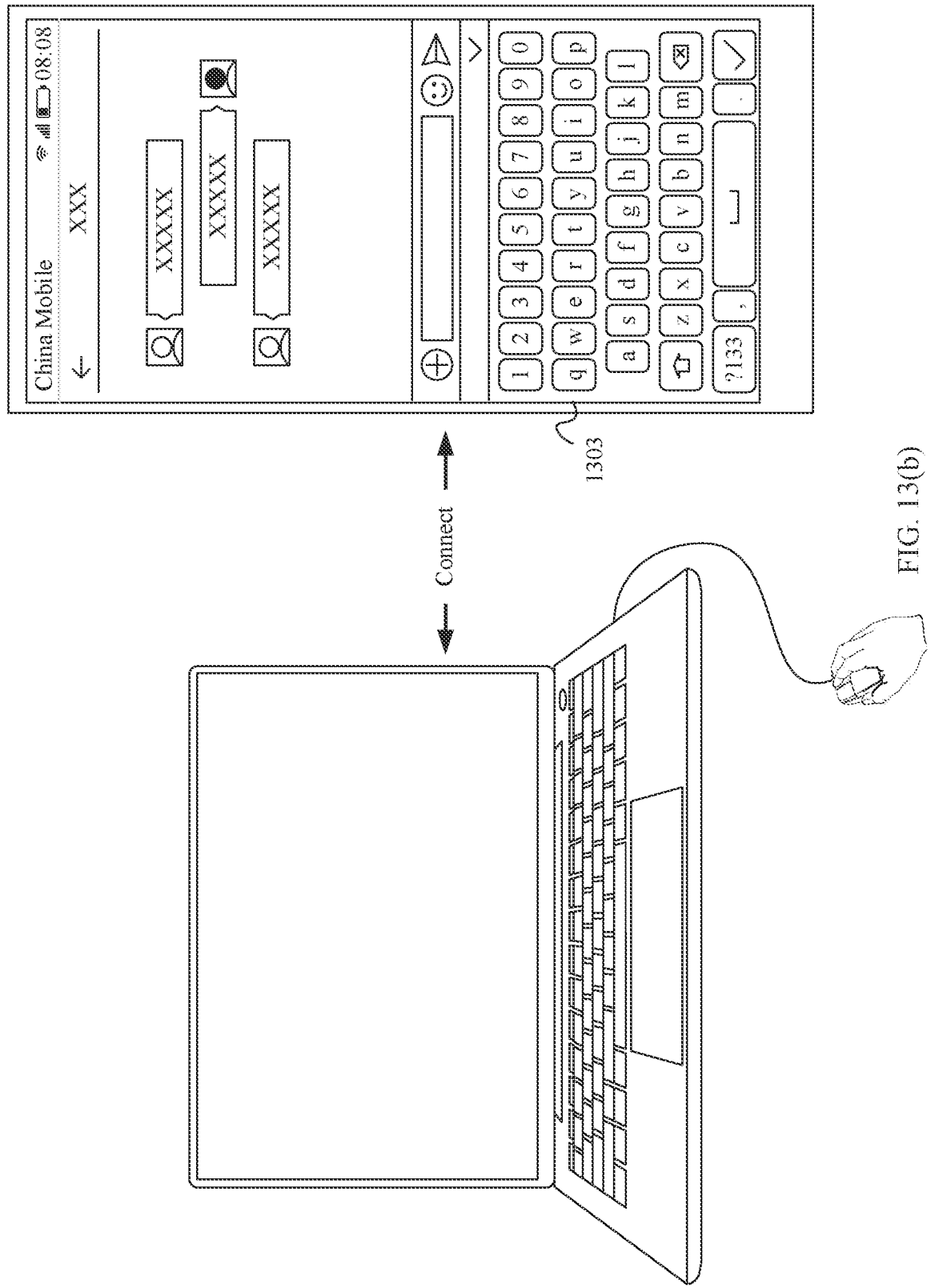

For another example, as shown in FIG. 13(a), the mobile phone currently displays a chat interface 1301. The chat interface 1301 includes an input box 1302. When the user wants to enter a character in the input box 1302 by using the virtual keyboard of the mobile phone, the user may perform a tap operation at a location of the input box 1302 on the touchscreen of the mobile phone. Then, the mobile phone may obtain a corresponding input event, and the mobile phone may determine, based on an input device ID or an input mode included in the input event, that an input source that inputs the tap operation is the touchscreen of the mobile phone. Therefore, as shown in FIG. 13(b), as a response to the tap operation, the mobile phone can display the virtual keyboard 1303 on the mobile phone, and the user can enter the character in the input box 1302 by using the virtual keyboard 1303.

The foregoing method is used in the scenario in which the mobile phone and the PC are collaboratively used. When the user performs the operation in the input box of the mobile phone by using the input device of the PC, the mobile phone may not display the virtual keyboard of the mobile phone, and the user may implement input by using the keyboard of the PC. When the user performs the operation in the input box by using the input device of the mobile phone, the virtual keyboard is displayed on the mobile phone, and the user may implement input by using the virtual keyboard. In this way, the user does not need to frequently switch attention between the two devices, thereby improving efficiency of collaboratively using the plurality of terminals.

Figure 14:
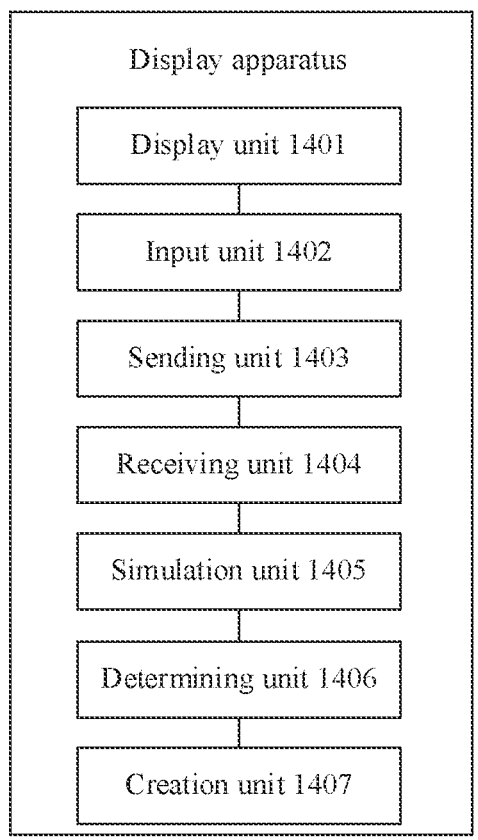
FIG. 14 is a schematic composition diagram of a display apparatus according to an embodiment of this application.

FIG. 14 is a schematic composition diagram of a display apparatus according to an embodiment of this application. As shown in FIG. 14, the apparatus may be used in a second terminal (for example, the foregoing mobile phone). The second terminal is connected to a first terminal. The apparatus may include a display unit 1401, an input unit 1402, and a sending unit 1403.

The display unit 1401 is configured to display a first interface.

The input unit 1402 is configured to receive a first operation of a user on content on the first interface.

The sending unit 1403 is configured to send data to the first terminal in response to the first operation when an input source of the first operation is an input device of the first terminal, where the data is used the first terminal to display a second interface on a display of the first terminal.

The display unit 1401 is further configured to display the second interface on a display of the second terminal in response to the first operation when the input source of the first operation is an input device of the second terminal.

Further, when the input source of the first operation is the input device of the first terminal, the apparatus may further include: a receiving unit 1404, configured to receive shuttle state information from the first terminal, where the shuttle state information may be used to indicate that a shuttle of an input device starts.

Further, the receiving unit 1404 is further configured to receive a first operation parameter from the first terminal, where the first operation parameter is an operation parameter included in a first input event corresponding to the first operation when the user performs the first operation by using the input device of the first terminal.

The apparatus may further include a simulation unit 1405 and a determining unit 1406.

The simulation unit 1405 is configured to simulate the first input event based on the first operation parameter.

The determining unit 1406 is configured to determine, based on the simulated first input event, that the input source of the first operation is the input device of the first terminal. That the sending unit 1403 sends data to the first terminal in response to the first operation specifically includes: The sending unit 1403 sends the data to the first terminal in response to the first input event.

Further, the determining unit 1406 is specifically configured to determine that an input device identifier included in the simulated first input event is an identifier of a virtual input device, where the virtual input device is created by the second terminal to simulate an input event; or determine that an input device type indicated by an input mode included in the simulated first input event is the same as a type of the input device of the first terminal, and determine that the shuttle state information used to indicate that a shuttle of an input device starts is received from the first terminal.

Further, when the user performs the first operation by using the input device of the second terminal, the determining unit 1406 is further configured to determine, based on a second input event corresponding to the first operation, that the input source of the first operation is the input device of the second terminal. That the display unit 1401 displays the second interface on a display of the second terminal in response to the first operation may include: The display unit 1401 displays the second interface on the display of the second terminal in response to the second input event.

Further, the determining unit 1406 is specifically configured to: determine that an input device identifier included in the second input event is an identifier of the input device of the second terminal; or determine that an input device type indicated by an input mode included in the second input event is the same as a type of the input device of the second terminal.

Further, the apparatus may further include: a creation unit 1407, configured to create a virtual input device after a connection to the first terminal is successfully established; or the receiving unit 1404 is further configured to receive a notification message from the first terminal, where the notification message is used to indicate that a keyboard and mouse sharing node of the first terminal is enabled, and the creation unit 1407 is configured to create the virtual input device in response to the notification message, where the virtual input device is used by the second terminal to simulate an input of the input device of the first terminal.

Further, the display unit 1401 is further configured to display a third interface, where the third interface includes an input box.

The input unit 1402 is further configured to receive a second operation of the user on the input box.

The display unit 1401 is further configured to display a virtual keyboard on the display of the second terminal in response to the second operation when an input source of the second operation is the input device of the second terminal.

Further, the sending unit 1403 is further configured to send data of the third interface to the first terminal in response to the second operation when the input source of the second operation is the input device of the first terminal. No virtual keyboard is displayed on the third interface, and the data of the third interface is used by the first terminal to display the third interface on the display of the first terminal.

Further, when the user performs the second operation by using the input device of the second terminal, the determining unit 1406 is further configured to determine, based on a third input event corresponding to the second operation, that the input source of the second operation is the input device of the second terminal. That the display unit 1401 displays a virtual keyboard on the display of the second terminal in response to the second operation may include: The display unit 1401 displays the virtual keyboard on the display of the second terminal in response to the third input event.

Further, the determining unit 1406 is specifically configured to: determine that an input device identifier included in the third input event is an identifier of the input device of the second terminal; or determine that an input device type indicated by an input mode included in the third input event is the same as a type of the input device of the second terminal.

Further, the receiving unit 1404 is further configured to receive a second operation parameter from the first terminal, where the second operation parameter is an operation parameter included in a fourth input event corresponding to the second operation when the user performs the second operation by using the input device of the first terminal. The simulation unit 1405 is further configured to simulate the fourth input event based on the second operation parameter. The determining unit 1406 is further configured to determine, based on the simulated fourth input event, that an input source of the second operation is the input device of the first terminal. That the sending unit 1403 sends data of the third interface to the first terminal in response to the second operation specifically includes: The sending unit 1403 sends the data of the third interface to the first terminal in response to the fourth input event.

Further, the determining unit 1406 is specifically configured to determine that an input device identifier included in the simulated fourth input event is an identifier of a virtual input device; or determine that an input device type indicated by an input mode included in the simulated fourth input event is the same as a type of the input device of the first terminal, and determine that the shuttle state information used to indicate that a shuttle of an input device starts is received from the first terminal.

The display apparatus shown in FIG. 14 may be further used by the second terminal to implement the following functions. The second terminal is connected to the first terminal, a keyboard and mouse sharing mode of the first terminal is enabled, and the second terminal creates a virtual input device, configured to simulate an input of the input device of the first terminal.

The display unit 1401 is configured to display an interface.

The input unit 1402 is configured to receive an operation of a user on an input box on the interface.

The display unit 1401 is further configured to display, by the second terminal, a virtual keyboard on the display of the second terminal in response to the operation when an input source of the operation is the input device of the second terminal.

Further, the display unit 1401 is further configured to: when an input source of the operation is an input device of the first terminal, skip displaying the virtual keyboard on the display of the second terminal in response to the operation.

Further, the sending unit 1403 is configured to: when the input source of the operation is the input device of the first terminal, send data of the interface to the first terminal in response to the operation. The data is used by the first terminal to display the interface on a display of the first terminal, and no virtual keyboard is displayed on the interface.

Further, when the user performs the operation on the input box by using the input device of the second terminal, the determining unit 1406 is configured to determine, based on an input event corresponding to the operation, that the input source of the operation is the input device of the second terminal. That the display unit 1401 displays a virtual keyboard on the display of the second terminal in response to the operation may include: The display unit 1401 displays the virtual keyboard on the display of the second terminal in response to the input event corresponding to the operation.

Further, the determining unit 1406 is specifically configured to: determine that an input device identifier included in the input event is an identifier of the input device of the second terminal; or determine that an input device type indicated by an input mode included in the input event is the same as a type of the input device of the second terminal.

Further, when the input source of the operation is the input device of the first terminal, the receiving unit 1404 is configured to receive shuttle state information from the first terminal, where the shuttle state information may be used to indicate that a shuttle of an input device starts, or the shuttle state information may be used to indicate that the second terminal starts to accept an input from the input device of the first terminal.

Further, when the input source of the operation is the input device of the first terminal, the receiving unit 1404 is further configured to receive an operation parameter from the first terminal, where the operation parameter is an operation parameter included in an input event corresponding to the operation when the user performs the operation by using the input device of the first terminal.

The simulation unit 1405 is configured to simulate the corresponding input event based on the operation parameter.

The determining unit 1406 is further configured to determine, based on the simulated input event, that the input source of the operation is the input device of the first terminal. That the display unit 1401 does not display a virtual keyboard on the display of the second terminal in response to the operation may include: The display unit 1401 does not display the virtual keyboard on the display of the second terminal in response to the input event. That the sending unit 1403 sends data of the interface to the first terminal in response to the operation may include: The sending unit 1403 sends the data of the interface to the first terminal in response to the input event.

Further, the determining unit 1406 is specifically configured to determine that an input device identifier included in the simulated input event is an identifier of a virtual input device, where the virtual input device is created by the second terminal to simulate an input event; or determine that an input device type indicated by an input mode included in the simulated input event is the same as a type of the input device of the first terminal, and determine that the shuttle state information used to indicate that a shuttle of an input device starts is received from the first terminal.

Further, the creation unit 1407 is configured to create a virtual input device after a connection to the first terminal is successfully established; or the receiving unit 1404 is further configured to receive a notification message from the first terminal, where the notification message is used to indicate that a keyboard and mouse sharing mode of the first terminal is enabled, and the creation unit 1407 is configured to create the virtual input device in response to the notification message, where the virtual input device is used by the second terminal to simulate an input of the input device of the first terminal.

An embodiment of this application further provides a display apparatus. The apparatus may be used in an electronic device, for example, the first terminal or the second terminal in the foregoing embodiments. The apparatus may include a processor and a memory configured to store an executable instruction of the processor. When the processor is configured to execute the instruction, the display apparatus is enabled to implement functions or steps performed by the mobile phone or the PC in the foregoing method embodiments.

An embodiment of this application further provides an electronic device (the electronic device may be a terminal, for example, the first terminal or the second terminal in the foregoing embodiments). The electronic device may include a display, a memory, and one or more processors. The display and the memory are coupled to the processor. The memory is configured to store computer program code. The computer program code includes computer instructions. When the processor executes the computer instructions, the electronic device may perform functions or steps performed by the mobile phone or the PC in the foregoing method embodiments. Certainly, the electronic device includes but is not limited to the foregoing display, memory, and one or more processors. For example, for a structure of the electronic device, refer to the structure of the mobile phone shown in FIG. 2A.

Figure 15:
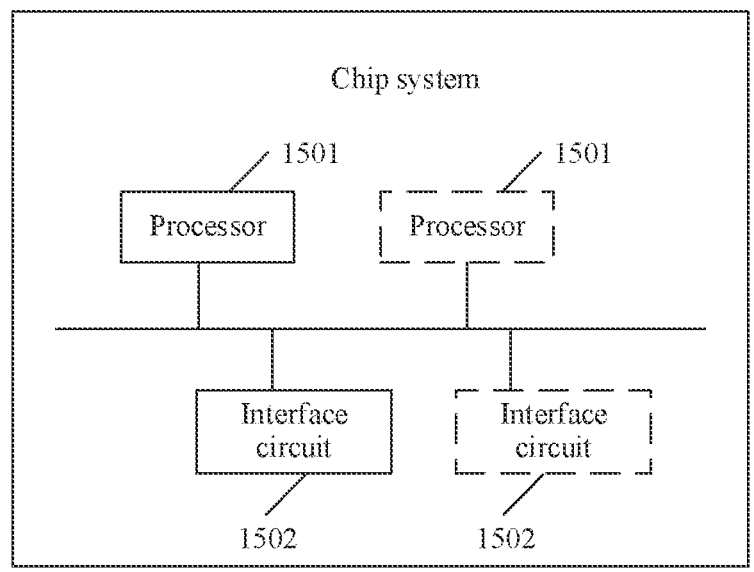
FIG. 15 is a schematic diagram of composition of a chip system according to an embodiment of this application.

An embodiment of this application further provides a chip system. The chip system may be used in an electronic device, for example, the terminal (for example, the first terminal or the second terminal) in the foregoing embodiments. As shown in FIG. 15, the chip system includes at least one processor 1501 and at least one interface circuit 1502. The processor 1501 may be a processor in the foregoing electronic device. The processor 1501 and the interface circuit 1502 may be interconnected through a line. The processor 1501 may receive computer instructions from the memory of the electronic device through the interface circuit 1502 and execute the computer instructions. When the computer instructions are executed by the processor 1501, the electronic device may be enabled to perform steps performed by the mobile phone or the PC in the foregoing embodiments. Certainly, the chip system may further include another discrete device. This is not specifically limited in this embodiment of this application.

An embodiment of this application further provides a computer readable storage medium, configured to store computer instructions run by an electronic device such as the terminal (for example, the mobile phone or the PC).

An embodiment of this application further provides a computer program product, including computer instructions run by an electronic device such as the terminal (for example, the mobile phone or the PC).

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium Based on such an understanding, the technical solutions of embodiments of this application essentially, or the part contributing to the current technology, or all or some of the technical solutions may be implemented in the form of a software product. The software product is stored in a storage medium and includes several instructions for instructing a device (which may be a single chip microcomputer, a chip or the like) or a processor (processor) to perform all or some of the steps of the methods described in embodiments of this application. The foregoing storage medium includes any medium that can store program code, such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a second terminal, wherein the method comprises:
    displaying a first interface comprising content;
    receiving a first operation of a user on the content;
    sending, to a first terminal coupled to the second terminal, in response to the first operation, and when a first input source of the first operation is a first input device of the first terminal, first data to enable the first terminal to display a second interface on a first display of the first terminal;
    displaying, on a second display of the second terminal, in response to the first operation and when the first input source is a second input device of the second terminal, the second interface
    receiving, from the first terminal, a first operation parameter comprised in a first input event corresponding to the first operation when the user performs the first operation using the first input device;
    simulating, based on the first operation parameter, the first input event to obtain a simulated first input event; and
    determining that an input device identifier comprised in the simulated first input event is an identifier of a virtual input device created by the second terminal to simulate an input event, or
    determining that an input device type indicated by an input mode comprised in the simulated first input event is the same as a type of the first input device and receiving from the first terminal shuttle state information indicating that a shuttle of a third input device is started.

2. The method of claim 1, wherein the first input source is the first input device, and wherein before receiving the first operation, the method further comprises receiving, from the first terminal, shuttle state information indicating that a shuttle of a third input device is started.

3. The method of claim 1, wherein the first input source is the first input device, and wherein the method further comprises:
    determining, based on the simulated first input event, that the first input source is the first input device; and
    further sending, to the first terminal and in response to the first input event, the first data.

4. The method of claim 1, further comprising:
    determining, based on a second input event corresponding to the first operation and when the user performs the first operation using the second input device, that the first input source is the second input device; and
    further displaying, on the second display in response to the second input event, the second interface.

5. The method of claim 4, further comprising:
    determining that an input device identifier comprised in the second input event is an identifier of the second input device; or
    determining that an input device type indicated by an input mode comprised in the second input event is the same as a type of the second input device.

6. The method of claim 1, further comprising:
    creating a virtual input device after successfully establishing a connection to the first terminal; or
    receiving, from the first terminal, a notification message indicating that a keyboard and mouse sharing mode of the first terminal is enabled and creating, in response to the notification message, the virtual input device, wherein the virtual input device enables the second terminal to simulate an input of the first input device.

7. The method of claim 1, further comprising:
    displaying a third interface comprising an input box;
    receiving, on the input box, a second operation of the user; and
    displaying, in response to the second operation and when a second input source of the second operation is the second input device, a virtual keyboard on the second display.

8. The method of claim 7, further comprising sending, to the first terminal, in response to the second operation, and when the second input source is the first input device, second data of the third interface, wherein the virtual keyboard is not displayed on the third interface, and wherein the second data enables the first terminal to display the third interface on the first display.

9. A system comprising:
    a first terminal; and
    a second terminal coupled to the first terminal and configured to:
        display a first interface comprising content;
        receive a first operation of a user on the content;
        display, on a second display of the second terminal, in response to the first operation, and when an input source of the first operation is a second input device of the second terminal, a second interface; and
        send, to the first terminal, in response to the first operation, and when the input source is a first input device of the first terminal, first data, wherein the first terminal is configured to:
receive the first data;
display, on a first display of the first terminal and based on the first data, the second interface;
receive, from the first terminal, the first operation parameter;
simulate, based on the first operation parameter, the first input event to obtain a simulated first input event; and
determine that an input device identifier comprised in the simulated first input event is an identifier of a virtual input device created by the second terminal to simulate an input event, or
determine that an input device type indicated by an input mode comprised in the simulated first input event is the same as a type of the first input device and receive from the first terminal shuttle state information indicating that a shuttle of a third input device is started.

10. The system of claim 9, wherein when the user enters the first operation using the first input device, the first terminal is further configured to:
intercept a first input event corresponding to the first operation; and
send, to the second terminal, a first operation parameter comprised in the first input event.

11. The system of claim 10, wherein the second terminal is further configured to:
determine, based on the simulated first input event, that the input source is the first input device; and
further send, to the first terminal and in response to the first input event, the first data.

12. The system of claim 10, wherein the first terminal is further configured to:
determine that a cursor displayed on the first terminal slides out of an edge of the first display; and
start an input event interception.

13. The system of claim 9, wherein when the user performs the first operation using the second input device, the second terminal is further configured to:
determine, based on a second input event corresponding to the first operation, that the input source is the second input device; and
further display, on the second display and in response to the second input event, the second interface.

14. A second terminal, comprising:
a memory configured to store instructions; and
a processor coupled to the memory and configured to execute the instructions to cause the second terminal to:
display a first interface comprising content;
receive a first operation of a user on the content;
send, to a first terminal coupled to the second terminal, in response to the first operation, and when an input source of the first operation is a first input device of the first terminal, first data to enable the first terminal to display a second interface on a first display of the first terminal;
display, on a second display of the second terminal, in response to the first operation, and when the input source is a second input device of the second terminal, the second interface;
receive, from the first terminal, a first operation parameter comprised in a first input event corresponding to the first operation when the user performs the first operation using the first input device;
simulate, based on the first operation parameter, the first input event to obtain a simulated first input event; and
determine that an input device identifier comprised in the simulated first input event is an identifier of a virtual input device created by the second terminal to simulate an input event, or
determine that an input device type indicated by an input mode comprised in the simulated first input event is the same as a type of the first input device and receive from the first terminal shuttle state information indicating that a shuttle of a third input device is started.

15. The second terminal of claim 14, wherein the input source is the first input device, and wherein before receiving the first operation, the processor is further configured to execute the instructions to cause the second terminal to receive, from the first terminal, shuttle state information indicating that a shuttle of a third input device is started.

16. The second terminal of claim 14, wherein the input source is the first input device, and wherein the processor is further configured to execute the instructions to cause the second terminal to:
determine, based on the simulated first input event, that the input source is the first input device; and
further send, to the first terminal and in response to the first input event, the first data.

17. The second terminal of claim 14, wherein the processor is further configured to execute the instructions to cause the second terminal to:
determine, based on a second input event corresponding to the first operation and when the user performs the first operation using the second input device, that the input source is the second input device; and
further display, on the second display and in response to the second input event, the second interface.

18. The second terminal of claim 17, wherein the processor is further configured to execute the instructions to cause the second terminal to:
determine that an input device identifier comprised in the second input event is an identifier of the second input device; or
determine that an input device type indicated by an input mode comprised in the second input event is the same as a type of the second input device.

* * * * *

UNITED STATES PATENT AND TRADEMARK OFFICE
CERTIFICATE OF CORRECTION

| | | |
|---|---|---|
| PATENT NO. | : 11,947,998 B2 | Page 1 of 1 |
| APPLICATION NO. | : 18/043627 | |
| DATED | : April 2, 2024 | |
| INVENTOR(S) | : Sucheng Bian, Kai Hu and Xueer Zhou | |

It is certified that error appears in the above-identified patent and that said Letters Patent is hereby corrected as shown below:

On the Title Page

Page 2, item (56) FOREIGN PATENT DOCUMENTS:
CN 10109636 A 8/2019 should read CN 110109636 A 8/2019

Page 2, item (56) FOREIGN PATENT DOCUMENTS:
CN 10267073 A 9/2019 should read CN 110267073 A 9/2019

Signed and Sealed this
Thirtieth Day of April, 2024

*Katherine Kelly Vidal*

Katherine Kelly Vidal
*Director of the United States Patent and Trademark Office*